United States Patent [19]

Yu

[11] 3,906,463

[45] Sept. 16, 1975

[54] MOS MEMORY SYSTEM

[75] Inventor: Robert Tapei Yu, Tempe, Ariz.

[73] Assignee: Motorola, Inc., Chicago, Ill.

[22] Filed: June 3, 1974

[21] Appl. No.: 475,360

[52] U.S. Cl. .......................... 340/173 R; 340/172.5

[51] Int. Cl.[2] .......................................... G11C 11/40

[58] Field of Search ...................... 340/173 R, 172.5

[56] References Cited

UNITED STATES PATENTS

| | | | |
|---|---|---|---|
| 3,681,764 | 8/1972 | Cowant | 340/172.5 |
| 3,736,574 | 5/1973 | Gersbach | 340/172.5 |

*Primary Examiner*—Terrell W. Fears

*Attorney, Agent, or Firm*—Vincent J. Rauner; Charles R. Hoffman

[57] ABSTRACT

An MOS memory clip is provided in which an array of inverting memory cells is functionally subdivided into a plurality of subarrays in order to decrease the length and therefore the capacitance of the sense-write lines, associated with each row of inverting memory cells in the array. The internal decoded clock lines for each subarray are driven by column selection and decoding circuitry which is repeated for each of the subarrays. The subarrays are selected by additional address inputs to the row selection decode gates. The data control register and the timing control register are each associated with only one of the subarrays.

11 Claims, 18 Drawing Figures

PATENTED SEP 16 1975 3,906,463

SHEET 1

PATENTED SEP 1 6 1975 3.906,463

SHEET 3

MOS MEMORY SYSTEM

BACKGROUND OF THE INVENTION

MOS dynamic random access memories (RAMs) have provided the lowest cost semiconductor memory storage yet achievable. Recent research in the area of MOS dynamic RAMs has led to increasing bit density and faster access times, and various approaches to circuitry design and layout design have been exploited to achieve these increases. One of the techniques used to increase component density on a semiconductor chip has been the use of the so-called inverting cell concept, which reduces chip size by eliminating refresh circuitry required for non-inverting dynamic RAM cells. However, the write and read circuitry are conceptually different for converting cell memories and further, an additional row of storage cells called the data register is required. For RAMs which utilize internally generated clock signals, a second register comprising an additional row of storage cells has been required. A problem common to the layout and organization ration of all integrated circuit RAMs has been that of reducing the sense-write line capacitance in order to reduce the required charging current and to increase the speed of the reading and writing operations. This has been previously achieved by physically splitting up the arrays on the semiconductor chip and centering the decoding and column or row selection circuitry and cutting the length of the sense-write lines approximately in half, and thereby also having the capacitance. However, the circuitry decoding one of the subarrays has been different than that decoding the other of the subarrays thus formed. In order to refresh the entire memory, however, it has still been necessary to access, for example, all rows (or columns) and the array. Further, a data control cell has been required for each column of the total array. For memories with internal clock generation, a timing control cell has also been required for each column of the total array. These circuits, of course, require additional surface area of the semiconductor chip, increasing the chip size and therefore price per bit of the memory system. Other approaches to reducing the length and therefore the capacitance of the sense-write lines have been to organize the physical layout of the memory array so that it is elongated, with the sense-write lines running in the shorter dimension. This approach is provided elongated semiconductor chips which have reduced yields in semiconductor processing for a number of reasons, including photolithographic processing difficulties and die separation difficulties. Further, packages which accommodate substantially elongated semiconductor chips are not readily available and are expensive to design.

SUMMARY OF THE INVENTION

An object of this invention is to provide a semiconductor memory array having improved organization from a memory chip.

Another object of the invention is to provide an MOS memory array in which an array of memory storage cells is functionally subdivided into subarrays in which the corresponding columns (or rows) are selected simultaneously in each subarray by the same column address (or row) input signals.

Another object of the invention is to provide an MOS semiconductor chip including an array of inverting memory cells subdivided into subarrays in which corresponding columns (or rows) are simultaneously selected by the same column (or row) address input signals, said memory array having a data control cell register associated with only one of said subarrays.

Another object of the invention is to provide an MOS semiconductor chip including an array of inverting memory cells subdivided into subarrays in which corresponding columns (or rows) are simultaneously selected by the same column (or row) address input signals, said memory array having a memory timing cell associated with only one of said subarrays.

Briefly described, the invention provides a semiconductor memory chip including a fully decoded memory system thereon including an array of memory cells, a row decoding circuit, a plurality of address input circuits, wherein the memory cells are arranged as X subarrays of memory cells each arranged as $2^M$ rows and $2^N$ columns. The row decoding circuitry is coupled to each of the X subarrays for simultaneously selecting a corresponding one of said $2^M$ columns. In one embodiment, the memory cells are MOS inverting memory cells. A data control register is provided as a row of data control cells for only one of the X subarrays. In another embodiment an additional row of timing control cells is provided on one of the X subarrays.

BRIEF DESCRIPTION OF THE DRAWINGS

FIG. 1*a* represents the upper left-hand section of the chip, FIG. 1*b* represents the upper right-hand section, FIG. 1*c* represents the lower left-hand section and FIG. 1*d* represents the lower right-hand section.

1*a* – 1*d*, and is useful in describing the operation of the memory.

Figure 15:
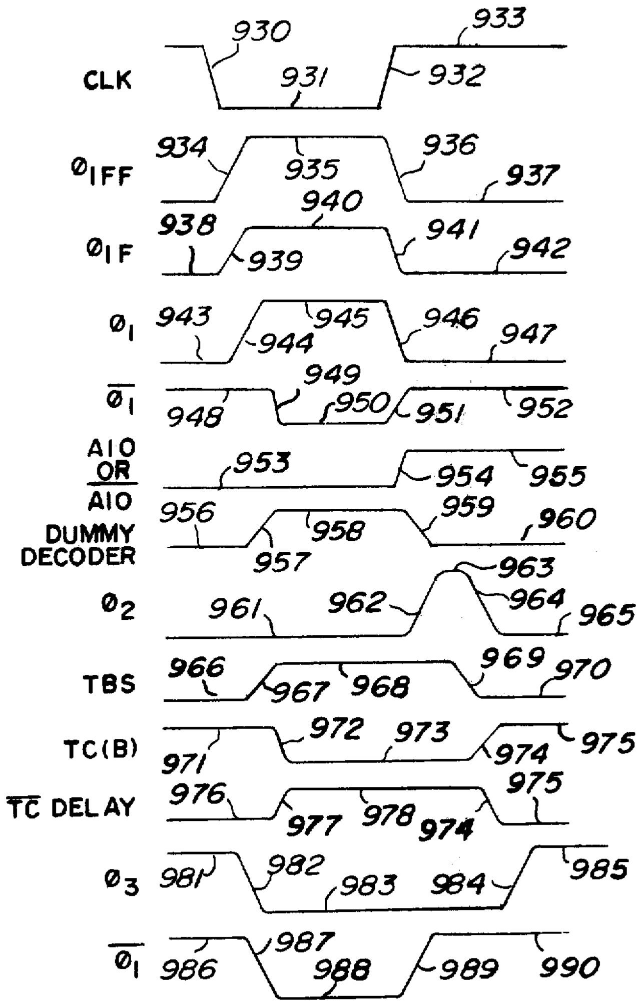

FIG. 15 is a timing diagram illustrating the major internally generated clock signals and timing signals for the memory of FIGS. 1*a* – 1*d* and is further useful in describing the invention.

DESCRIPTION OF THE INVENTION

The material in this patent application is related to U.S. Pat. No. 3,796,893, by Charles R. Hoffman and Donald H. Kube entitled "Peripheral Circuitry for Dynamic MOS RAM's" and assigned to the assignee of the present invention.

This application is also related to the following patent applications, filed on even date herewith and assigned to the present assignee: "MOS Memory System", by Robert T. Yu (SC-73785); "Bit Sense Line Speed-up Circuit for MOS RAM", by Robert T. Yu (SC-74751); "External Data Control Preset System for Inverting Cell MOS Ramdom Access Memory", by William W. Lattin (SC-74752); and External Exclusive OR Type Circuit for Inverting Cell MOS RAM", by Bernard D. Broeker (SC-74753).

Figure 1A:
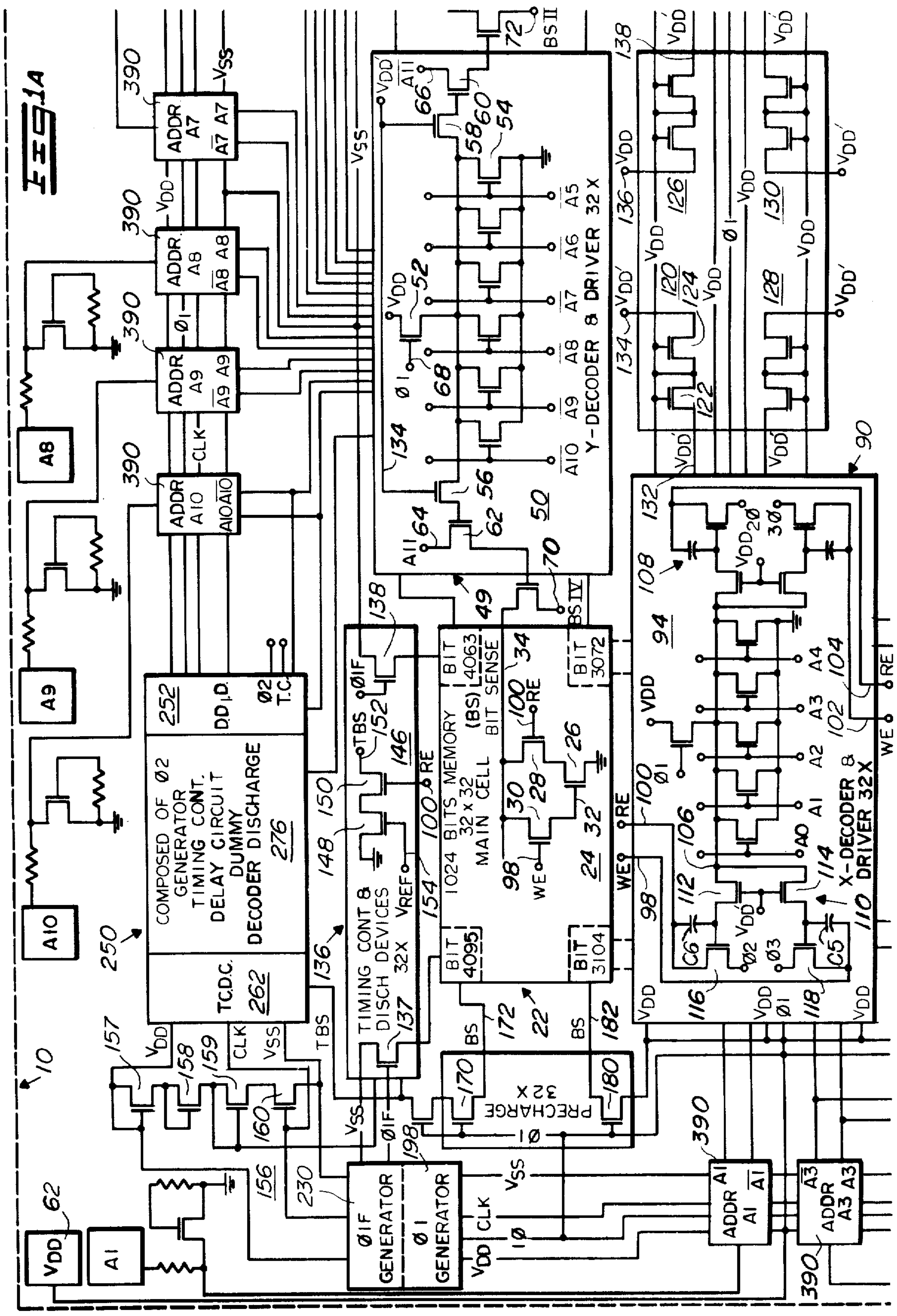
FIGS. 1*a* – 1*d* are schematic drawings of four sections, respectively, of an MOS random access memory chip.
Figure 1B:
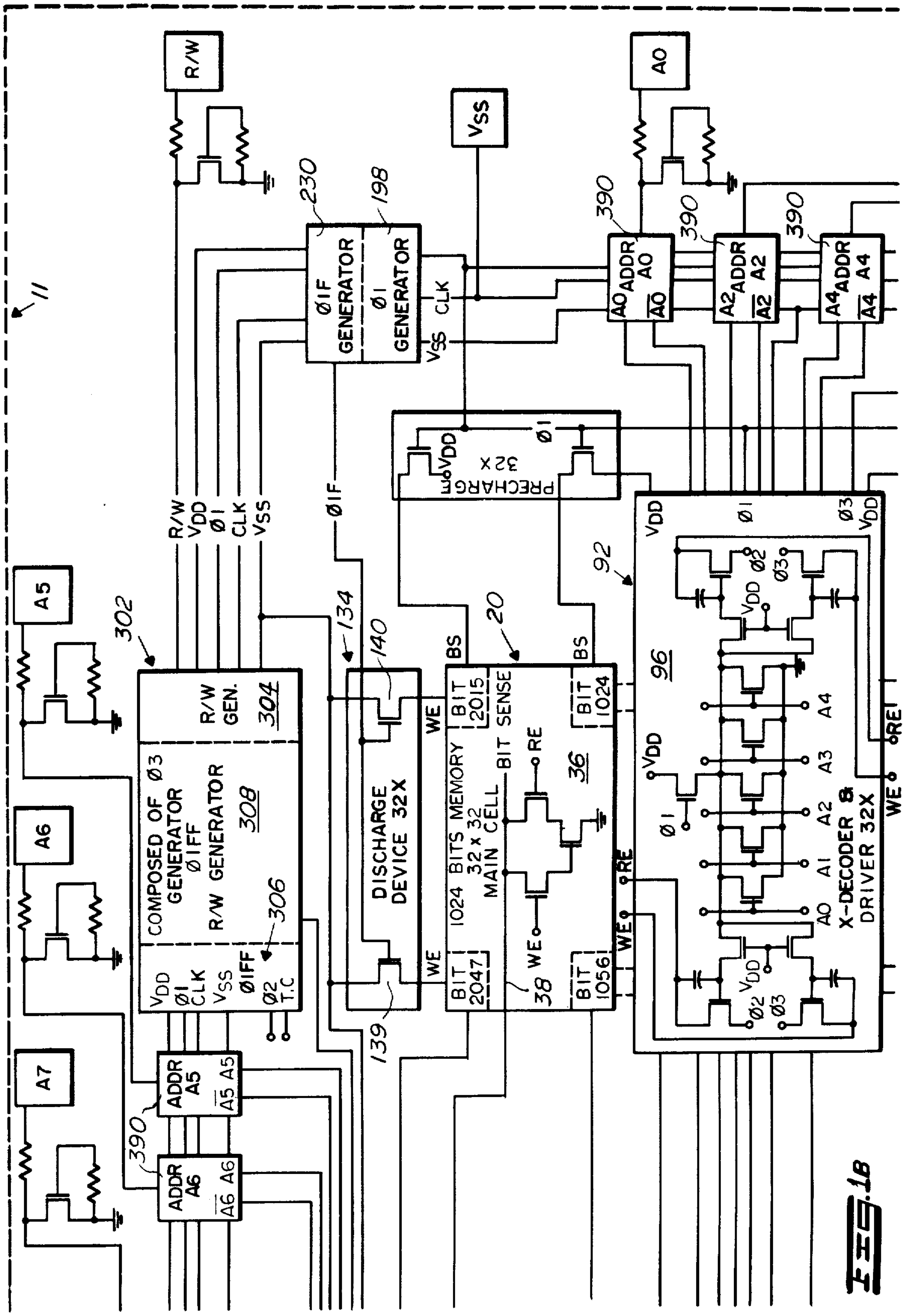
Figure 1C:
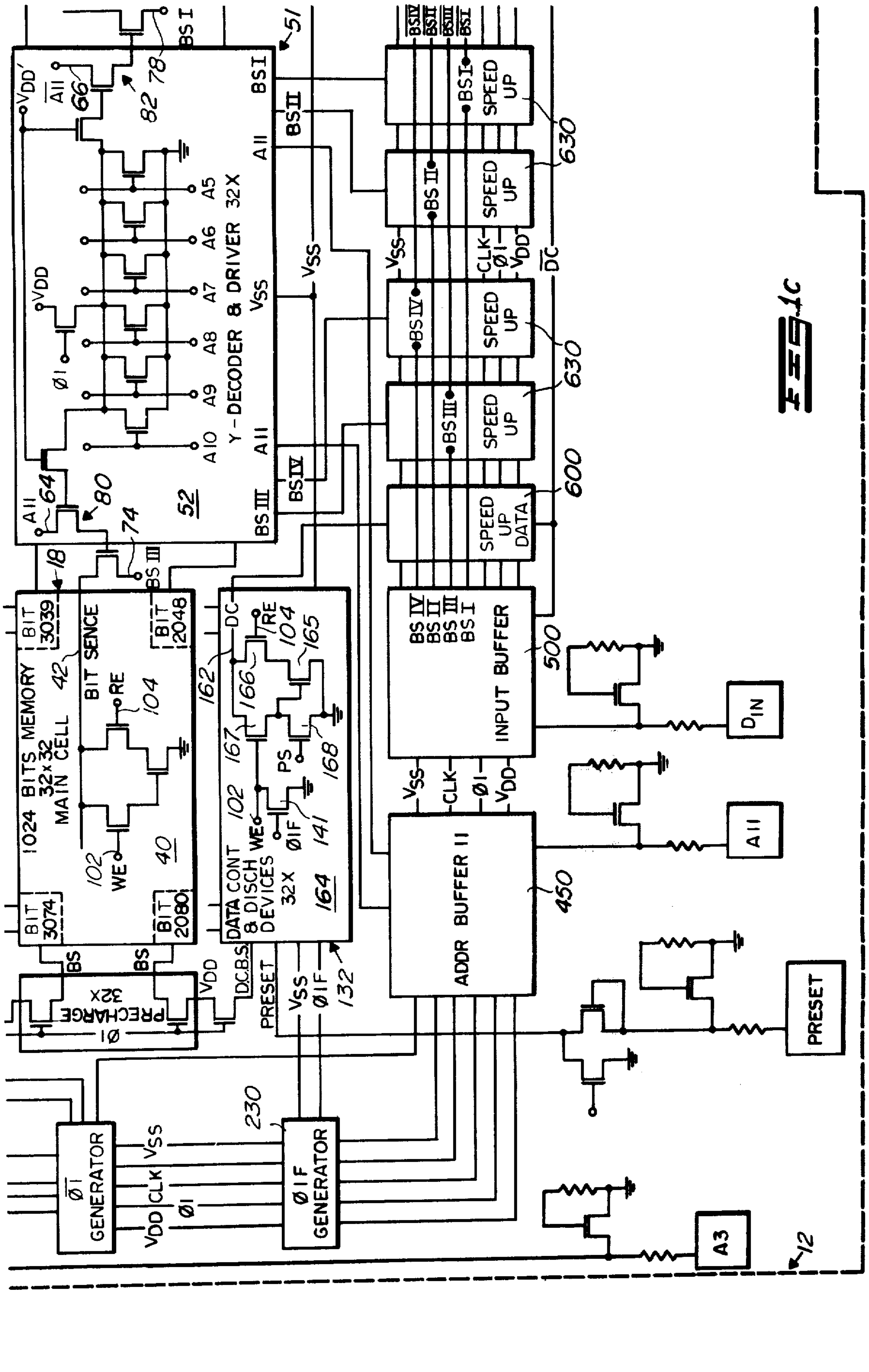
Figure 1D:
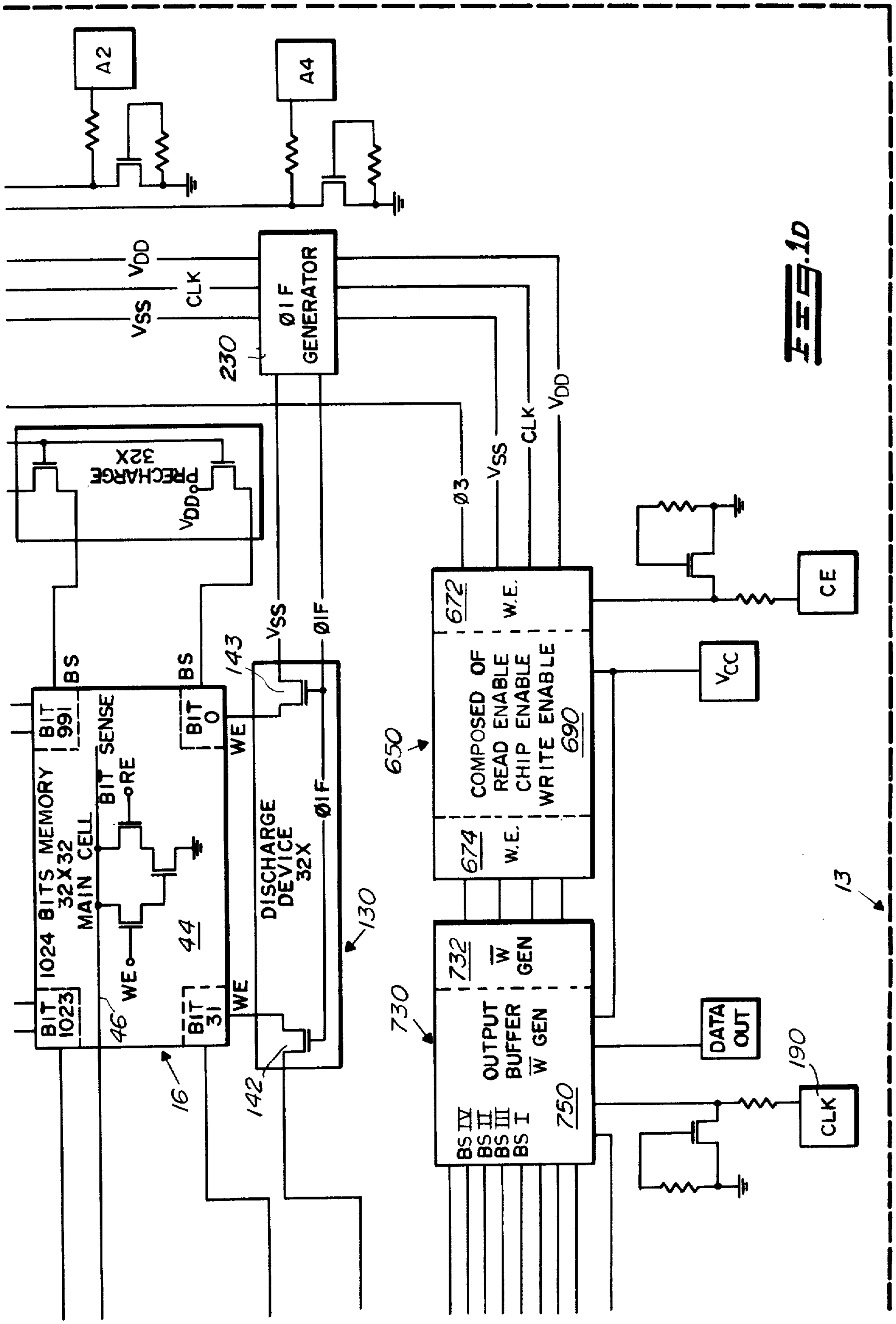

FIGS. 1*a* – 1*d* constitute four sections of a single drawing which is a partial schematic representation of a 4096 bit MOS RAM. FIG. 1*a* is the upper left-hand section 10 of the MOS RAM; FIG. 1*b* shows the upper right-hand section 11; FIG. 1*c* is the lower left-hand section 12; and FIG. 1*d* is the lower right-hand section 13. The subsequent description refers to FIGS. 1*a* – 1*d*. Quadrants 22, 20, 18 and 16 are each 32 × 32 arrays of MOS dynamic memory cells. A representative RAM cell is schematically illustrated in each of the quadrants, specifically RAM cells 24, 36, 40, and 44. Referring to RAM cell 24, it is seen that it includes the storage transistor 26, a read transistor 28 and a write transistor 30, transistors 26 and 28 being coupled in series between a ground conductor and bit sense line 34, write transistor 30 being coupled between sense line 34 and gate 32 of storage transistor 26.

Those skilled in the art will recognize that MOS transistors have three main electrodes, a gate electrode, a source electrode and a drain electrode. It is well known that MOSFETs are bilateral devices, so that the source and the drain are interchangeable. Hereinafter, description of a source or a drain as such will be understood to designate a particular terminal of the MOSFET, but will not necessarily designate its function as a source or a drain, since this will depend on the relative voltages thereof.

The information is stored on capacitance associated with gate 32. A row of 32 identical storage cells shares bit sense line 34, and there are 32 such rows in quadrant 22. A complete description of the inverting storage cell is given in the above-mentioned patent by Hoffman et al. The gate electrode of write transistor 30 is connected to a write line designated WE (Write Enable). Each write line is coupled to the write transistor of 32 storage cells forming a column of 32 devices. Similarly, gates of the read transistors of all storage cells in a column share a common Read Enable line designated RE. For convenience, each storage cell or "bit" in the major array (which consists of the four quadrants) is identified or designated by a number. For example, quadrant 16 includes bits 0 – 1023, bit 0 being in the lower right-hand corner of quadrant 16. Bit 4095 occurs diagonally opposite at the upper left-hand corner of quadrant 22.

Representative bit sense lines 38, 42 and 46 are shown coupled, respectively, to storage cells 36, 40, and 44 in the respective quadrants.

The 12 address inputs A0 — A11 are used to select one out of the 4096 bits. Selection of one of 4096 bits is achieved by selecting one row and one column in each of the left and right hand halves of the entire major memory array and then selecting either the right or the left half of the major array. Selection of the one of 32 rows of the upper half of the memory array is accomplished by one of 32 Y decoder and driver circuits in section 49, of which Y decoder/driver circuit 50 is a representative example. One of the 32 rows in the lower half of the memory is accomplished by means of one of the 32 Y decoder/driver circuits such as 52 in the section 51.

Y decoder/driver 50 includes a load device clocked by 01 conductor 68 and includes six switching devices 54, each being connected to one of the 64 combinations of the address inverter outputs. Devices 54 and 52 form a NOR gate, the output of which is coupled by two series connected MOSFETs 56 and 58 to the gate electrodes of coupling MOSFETs 62 and 60, respectively. Coupling MOSFET 62 couples one of the 32 bit sense lines to the quadrant bit sense line designated BSIV. Similarly, MOSFET 60 couples its sense line 38, which is one of the rows in quadrant 20, to BSII. Similarly, BSI and BSIII are coupled to one of 32 bit sense lines in quadrants 18 and 16, respectively, by coupling devices 80 and 82 of decoder driver 52. To summarize, one of 64 Y decoder/driver circuits selects one row out of 64 rows, and couples the bit sense line for the left-hand side of the memory array to one of the quadrant bit sense lines and also couples one of the bit sense lines corresponding to the selected row for the right-hand side of the memory array to another of the quadrant bit sense lines. The $A_{11}$ address buffer then selects which side, either the left-hand side or the right-hand side, of the memory is selected.

In order to select a single cell out of the 4096 bit array, one column is selected from each of the right and left-hand sides of the memory, and the cell at the intersection at the selected column and selected row of the selected half of the memory is then coupled by means of the bit sense line for that cell and the bit sense line for that quadrant to the read/write circuitry.

X decoder/driver sections 90 and 92, respectively, each contain 32 X decoder/driver circuits, including X decoder driver circuits 94 and 96. Referring to X decoder/driver circuit 94, it is seen that it provides the drive signal applied to the upper Write Enable (WE) and Read Enable (RE) lines 98 and 100, and also lower WE and RE lines 102 and 104. Similarly, the drive portion of decoder/driver 96 generates the upper and lower WE and RE lines. The X decoder/driver circuits in sections 90 and 92 include five input NOR gate sections similar to the NOR gates of the Y decoder/driver circuits; the inputs are connected to the 32 binary combinations of the address variables A0 – A4, so that one of the 32 columns for each half of the memory are selected thereby. Output 106 of the NOR gate section of X decoder/driver 94 drives upper driver circuit 110 and lower driver circuit 108. Upper X driver circuit 110 includes MOSFETS 112 and 114 having their gates connected to $V_{DD}'$ and their sources connected to output 106. The source of MOSFET 112 is connected to one terminal of capacitor C6 and to the gate of coupling MOSFET 116, which has its source connected to 02 and its drain connected to RE line 100, which is also connected to the other terminal of capacitor C6. MOSFET 118 has its source connected to 03 and its drain connected to WE line 98 and the other terminal of C5, the first terminal of C5 being connected to the gate of MOSFET 118 and the source of MOSFET 114. The structure of lower X driver circuit 108 is entirely similar to that of upper X driver circuit 110. Thus, it is seen that for one of the 32 decoder/drivers in each of sections 90 and 92 which is selected, output 106 is high after the decoding delay time, turning the respective coupling MOSFETs on, so that the signal 03 is coupled to WE lines 98 and 102 and 02 is coupled to RE lines 100 and 104. Thus, an entire column of storage cells in each half of the memory is selected.

The externally applied power supply voltage is designated $V_{DD}$. However, for the X and Y driver circuits described above, an internally generated voltage designated $V_{DD}'$ is generated. Circuits 120, 126, 128 and 130 generate the $V_{DD}'$ voltages required by the X and Y decoder/driver circuits. Circuit 120 includes MOSFETs 122 and 124, each having their drain connected to $V_{DD}$ and their gate connected to $V_{DD}$. The source of MOSFET 122 is connected to $V_{DD}'$ line 132 and the source of MOSFET 124 is connected to $V_{DD}'$ line 134.

The reason for generating the voltage $V_{DD}'$, which is equal to $V_{DD} - V_{TH}$ where $V_{TH}$ is a threshold voltage of MOSFETs 122 and 124, is that the load devices of the X and Y decoder NOR gates precharge the respective outputs only to $V_{DD}-V_{TH}$ volts. Thus, it is desirable to have only $V_{DD}-V_{TH}$ applied to the gates of, for example, MOSFETs 56 and 58 (for Y decoder/driver 50) and MOSFETs 112 and 114 (for X decoder/driver 94), so that these MOSFETs completely isolate the NOR gate outputs from the coupling devices (MOSFETs 60 and 62 for Y decoder/driver 50 and MOSFETs 116 and 118 for X decoder/driver 94). Then, the bootstrapping action of the driver circuits is relatively unimpaired by the capacitance associated with NOR gate outputs.

Sections 130, 132, 134 and 136 each contain 32 discharge devices, each having their source connected to $V_{SS}$ (also referred to herein as ground) and their drain connected, respectively, to one of the 32 WE lines for the adjacent quadrant. The gate of each of the discharge devices is connected to a $01_F$ conductor. The $01_F$ signal is generated by the clock generating system described hereinafter. In the partial schematic of FIGS. 1*a*– 1*d*, representative discharge devices are 137, 138, 139, 140, 141, 142 and 143. The purpose of the discharge devices is to help discharge all of the WE lines to ground before the bit sense lines 34, 38, 42, and 46 are precharged by the 01 clock signal, as is described hereinafter. Section 136 also includes 32 bit sense timing control circuits, a representative one of which is designated by reference numeral 146 and which includes two MOSFETs 148 and 150 connected in series between the ground conductor and timing bit sense line 152. The gate of MOSFET 150 of each of the timing bit sense cells is connected to the RE line (100) of the corresponding column of storage cells. The gate of MOSFET 148 is connected the $V_{REF}$ reference voltage conductor, 154. $V_{REF}$ is generated by circuit 156, which includes four MOSFETs coupled in series between $V_{DD}$ and $V_{SS}$, the upper three of which are diode-connected MOSFETs 156, 158 and 159; the gate of MOSFET 160 is connected to CLK conductor. The voltage generated at the gate of MOSFET 159 is designated $V_{REF}$.

Section 132 includes 32 data control devices, one connected to the We line and the RE line of each of the 32 columns of quadrant 18. The data control devices are all coupled to a data control line (DC) designated by numeral 162. Each data control device 164 includes a storage transistor 165, a read transistor 166 and a write transistor 167 connected in a configuration similar to that of the storage cells 40, etc. It also includes a MOSFET 168 connected between ground and the gate of MOSFET 165. MOSFET 168 has its gate connected to the PS (Preset) conductor to which an external signal may be applied to initialize the state of the data control cells to, for example, facilitate testing of the MOS RAM chip. An internal power on reset circuit could also be provided to generate the preset signal.

Each of the bit sense lines, such as 34, 38, etc., is coupled to a precharge device having its drain connected to $V_{DD}$ and its gate connected to 01 and its source connected to the respective bit sense line. Representative bit sense precharge devices for quadrant 22 include MOSFET 170 to precharge the bit sense line for the first row of that quadrant (172) and MOSFET 180 to precharge the bottom bit sense line 182 for quadrant 22. The bit sense lines in the other quadrants are precharged by similar devices shown in FIGS. 1*a* – 1*d*.

The MOS RAM of FIGS. 1*a* – 1*d* requires a number of different clock signals for operation, including, CLK, 01, $01_F$, $01_{FF}$, 02, 03, and $0_1'$. The latter six clock signals are derived from CLK; 03 is additionally controlled by the R/W (Read/Write) input signal.

CLK is externally applied to pad 190 (FIG. 1*c*). The circuits generating the above-named signals are described hereinafter.

Figure 2:
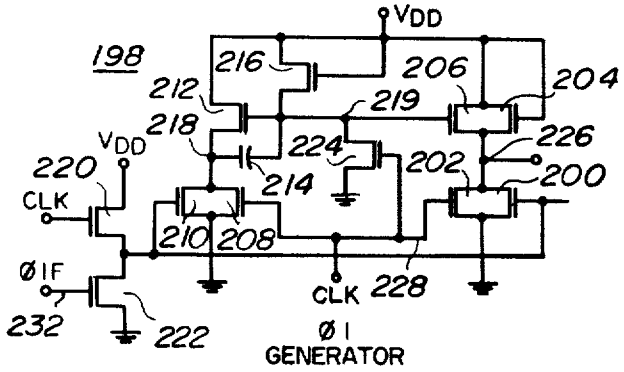
FIG. 2 is a schematic diagram of a 01 clock signal generator according to an embodiment of the invention.

A 01 generator is schematically depicted in FIG. 2. Referring to FIG. 2, 01 generator 198 includes a portion which is essentially a bootstrap NOR gate which includes MOSFETs 208 and 210 connected in parallel between ground and node 218. Load MOSFET 212 is connected between $V_{DD}$ and node 218. Bootstrap charging MOSFET 216 is connected between $V_{DD}$ and the gate of MOSFET 212. Bootstrap capacitor C4 (214) is connected between node 218 and the gate of MOSFET 212. The gate of MOSFET 216 is connected to $V_{DD}$. Disable MOSFET 224 is connected between ground and node 219, and has its gate coupled to CLK. 01 generator 198 also includes a push-pull inverter circuit which includes MOSFET 220 connected between $V_{DD}$ and node 228 and has its gate connected to CLK and also includes MOSFET 222 connected between node 228 and ground and having its gate connected to $01_F$ conductor 232. $01_F$ is the complement of CLK, and is delayed by the inverter delay of the $01_F$ generator 230 of FIG. 7. 01 generator 198 includes an output driver including parallel MOSFETs 200 and 202 coupled in parallel between ground and node 226, which is the 01 conductor. MOSFET 200 has its gate coupled to node 228 and MOSFET 202 has its gate coupled to CLK. The output driver also includes load MOSFET 206 and leakage MOSFET 204 connected in parallel between node 226 and $V_{DD}$, the gate of leakage MOSFET 204 being also connected to $V_{DD}$ and the gate of MOSFET 206 being connected to bootstrap node 219.

Figure 7:
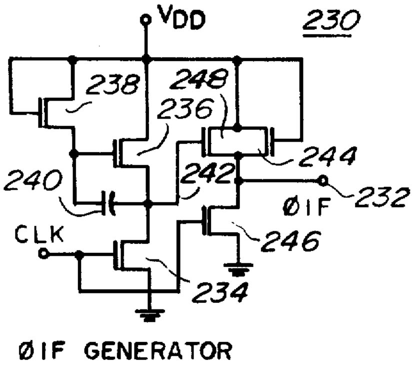
FIG. 7 is a schematic diagram of the $\mathbf{01}_F$ generator of FIGS. 1*a* – 1*d*.

Referring to FIG. 7, $01_F$ generator 230 is a conventional bootstrap driver which includes a bootstrap inverter state including switching MOSFET 234 having its gate connected to CLK and its drain connected to MOSFET 236, which has bootstrap capacitance 240 coupled between its source and gate and bootstrap charging diod-connected MOSFET 238 connected between $V_{DD}$ and the gate of load MOSFET 236. Output 242 of the bootstrap inverter is connected to the load MOSFET 248 of a push-pull output driver, which includes MOSFET 248 connected between $V_{DD}$ and output conductor 232 at which $01_F$ is generated. Switching MOSFET 246 is connected between node 232 and ground and has its gate connected to CLK.

Figure 4:
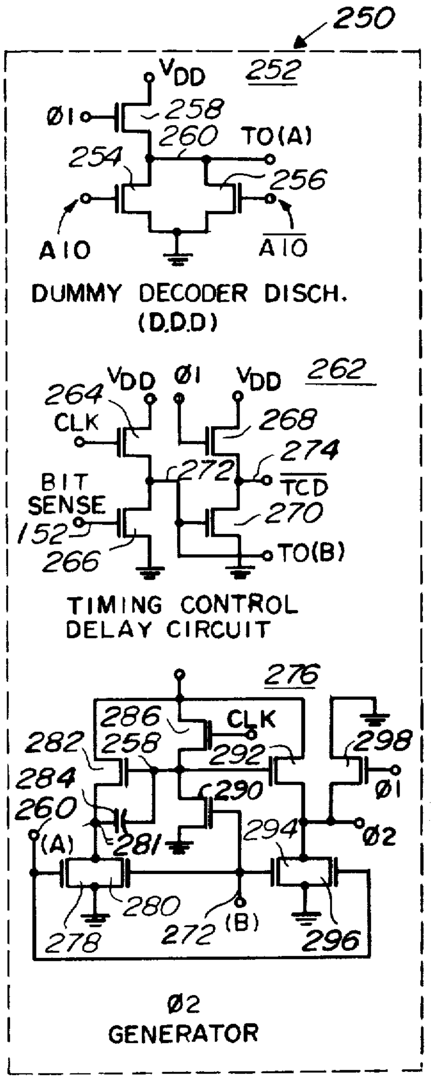
FIG. 4 is a schematic diagram of a 02 generator, a dummy decoder circuit, and a timing control delay circuit used in the embodiment of FIGS. 1*a* – 1*d*.

The 02 clock signal is generated by the circuitry 250 in FIG. 4, which includes dummy decoder discharge circuit 252, timing control delay circuit 262, and 02 generator circuit 276. Dummy decoder discharge circuit 252 is simply a dynamic two input NOR gate including parallel switching MOSFETs 254 and 256 coupled between ground and output node 260 and having their gates connected, respectively, $A_{10}$ to $\overline{A_{10}}$, which are the outputs from the $A_{10}$ address input buffer, to be described hereinafter. Of course, it is not necessary that the $A_{10}$ address input buffer be used; any of the 12 input address buffer outputs could be used, as will become clearer in the subsequent description of the operation. Load MOSFET 258, clocked by 01 is connected between $V_{DD}$ and node 260, which generates an output signal designated by the reference letter A.

In FIG. 4, timing control delay generator 262 includes a first dynamic inverter stage including load MOSFET 264 coupled between $V_{DD}$ and node 272 and clocked by CLK and switch MOSFET 266 coupled between node 272 and ground having its gate connected to timing bit sense line 152 (FIG. 1*a*) which is generated by the 32 dummy sense bits, or timing control, associated with quadrant 22. Signal B, generated at node 272, is utilized in 02 generator 276, and also serves as an input to the inverter including MOSFETs 268 and 270 which generates a signal at output 274. MOSFET 270 has its gate connected to node 272 and is coupled between node 274 and ground. MOSFET 268 has its gate connected to 01 and its drain connected to $V_{DD}$ and its source connected to node 274.

Referring to FIG. 4, 02 generator 276 includes a bootstrap NOR-type input section including input MOSFETs 278 and 280 connected in parallel between node 281 and ground, load MOSFET 282 connected between $V_{DD}$ and 281. Bootstrap capacitor 284 is connected between node 281 and the gate of MOSFET 282, and bootstrap charging MOSFET 286 is connected between $V_{DD}$ and the gate of MOSFET 282 having its gate connected to CLK and disable MOSFET 290 is connected between node 285 and ground. Node 260 is coupled to the gate of MOSFET 278, and node 272 is connected to the gate of MOSFET 280 and also to the gate of MOSFET 290. 02 generator 276 also includes an output buffer including pull-up MOSFET 292 connected between output node 300 and $V_{DD}$ having its gate connected to the gate of MOSFET 282. MOSFETs 294, 296, 298 are coupled between output node 300 and ground, MOSFET 298 having its gate connected to MOSFET 296 having its gate connected to node 260, and MOSFET 294 having its gate connected to node 272.

Figure 5:
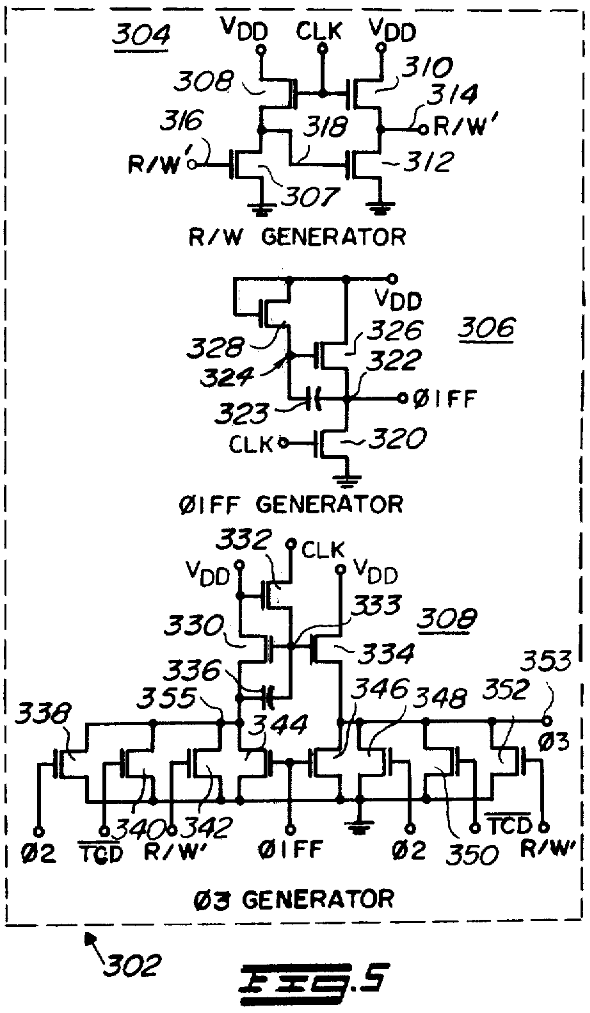
FIG. 5 is a schematic diagram of the 03 clock signal generator, the $\mathbf{01}_{FF}$ clock signal generator and the R/W signal circuits indicated in the partial schematic drawings of FIGS. 1*a* – 1*d*.

Referring to FIG. 5, 03 is generated by circuitry in section 302 which includes R/W generator 304 and 03 generator 308; $01_{FF}$ generator 306 is also included in section 302 for convenience. R/W generator 304 includes an inverter stage including MOSFET 308 connected between node 318 and $V_{DD}$ having its gate connected to CLK and MOSFET 306 connected between node 318 and ground having its gate connected to R/W input conductor 316. R/W generator 304 also includes an output inverter including MOSFET 310 connected between output node 314 and $V_{DD}$ and having its gate connected to CLK. It also includes switch MOSFET 312 connected between 314 and ground and having its gate connected to node 318. Output signal R/W is generated at node 314.

$01_{FF}$ generator 306 is a conventional bootstrap inverter including switch MOSFET 320 coupled between ground and node 322 having its gate connected to CLK and also including MOSFET 326 connected between $V_{DD}$ and node 322 and bootstrap capacitor 323 connected between node 324 and 322, the gate of MOSFET 326 being connected to node 324. Bootstrap charging MOSFET 328 has its gate and drain connected to $V_{DD}$ and its source connected to node 324.

In FIG. 5, 03 generator 308 consists of a first stage which is essentially a four-input clocked bootstrap NOR gate and a second stage which is also essentially a four-input clocked bootstrap driver stage which produces 03 at its output.

03 generator 308 includes MOSFET 332 coupled between CLK and node 333 and has its gate coupled to $V_{DD}$. MOSFET 330 is coupled between $V_{DD}$ and node 355 and has its gate coupled to node 333. Bootstrap capacitor 336 is coupled between nodes 333 and 355. MOSFETs 338, 340, 342, and 344 are coupled between node 355 and ground and have their gates coupled respectively, to 02, $\overline{TCD}$, R/W', and $01_{FF}$. MOSFET 334 is coupled between $V_{DD}$ and node 353 and has its gate coupled to node 333. MOSFET 346, 348, 350 and 352 are coupled between node 353 and ground and have their gates coupled, respectively to $01_{FF}$, 02, $\overline{TCD}$ and R/W'.

Figure 6:
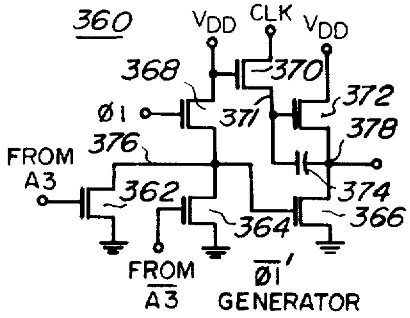
FIG. 6 is a schematic diagram of the $\overline{\mathbf{01}}'$ generator of FIGS. 1*a* – 1*d*.

Referring to FIG. 6, $\overline{01'}$ generator 360 includes a first stage which is a dynamic NOR gate including MOSFETs 362 and 364 coupled in parallel between ground and node 376, having their respective gate electrodes connected to the outputs of an address buffer described hereinafter. The NOR gate also includes load device 368 coupled between $V_{DD}$ and node 376 having its gate connected to 01. $\overline{01'}$ generator 360 also includes a bootstrap inverter output driver including MOSFET 366 connected between ground and output node 378 and having its gate connected to node 376, MOSFET 372 connected between $V_{DD}$ and node 378 and having its gate connected to node 371 and having bootstrap capacitor 374 connected between node 371 and node 378. MOSFET 370 is connected between CLK and the gate of MOSFET 372. The gate of MOSFET 370 is connected to $V_{DD}$.

Address buffer 390 includes a cross-coupled latching section including MOSFET 392 coupled between node 430 and $V_{DD}$ having its gate connected to CLK. MOSFET 394 is connected between nodes 430 and 422 and has its gate connected to node 426. MOSFETs 396 and 398 are coupled in parallel between node 422 and ground, MOSFET 396 having its gate connected to 01 and MOSFET 398 having its gate connected to node 428. Bootstrap capacitor 400 is connected between CLK and node 426; bootstrap capacitor 422 is connected between CLK and node 428. MOSFET 404 is connected between nodes 430 and 424 and has its gate connected to node 428. MOSFETs 406 and 408 are connected in parallel between ground and node 424, MOSFET 406 having its gate connected to 01 and MOSFET 408 having its gate connected to node 426. Address buffer 390 also includes MOSFET 410 connected between $V_{DD}$ and node 428 having its gate connected to 01 and MOSFET 412 connected between nodes 428 and 432 having its gate connected to CLK and the MOSFET 414 connected between node 432 and ground and having its gate connected to an address input conductor. Also included is MOSFET 416 connected between $V_{DD}$ and node 426 having its gate connected to 01 and MOSFET 418 connected between nodes 426 and 434 having its gate connected to CLK and MOSFET 420 connected between node 434 and ground having its gate connected to node 432.

Figures 8, 11:
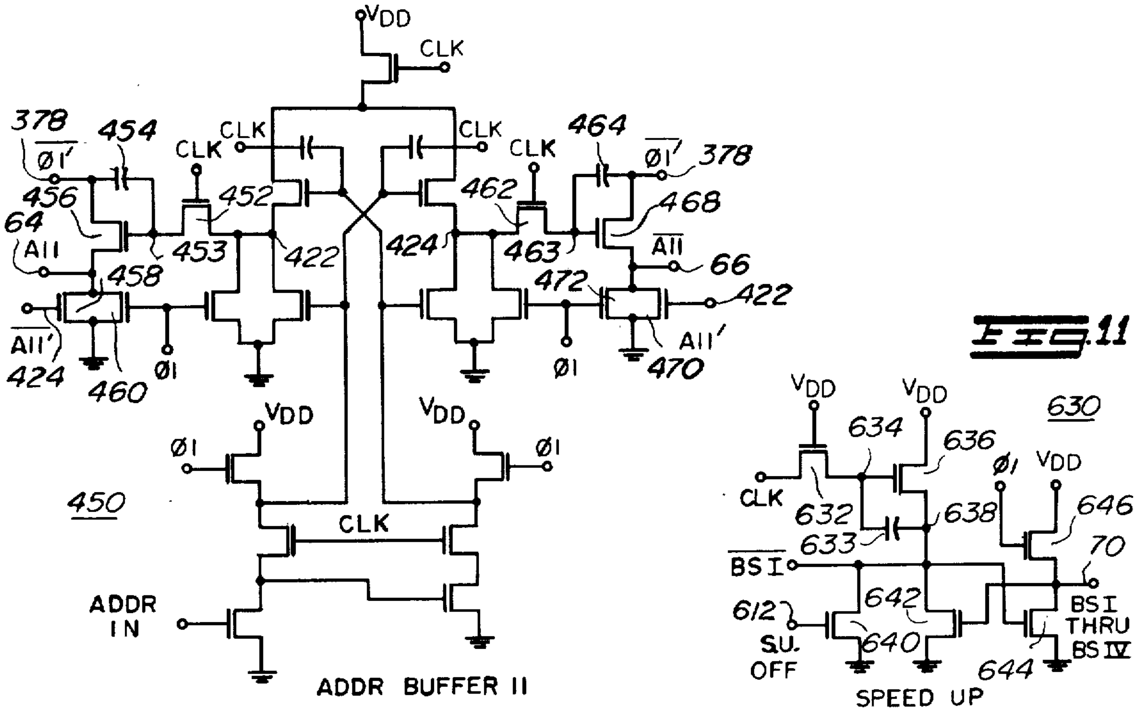
FIG. 8 is a schematic diagram of the address buffer 11 circuit of FIGS. 1*a* – 1*d*.
FIG. 11 is a schematic diagram of a speed-up circuit utilized in the memory of FIGS. 1*a* – 1*d*.

In FIG. 8, address buffer 11 is identical in topology to address buffer 390 which is used for the other address inputs and is designated by reference numeral 450, except that additional decoding circuitry is connected to nodes 422 and 424.

MOSFET 452 is connected between nodes 422 and 453 and has its gate connected to CLK. MOSFET 456 is connected between $\overline{01}'$ conductor 378 and $A_{11}$ output node 64 and has its gate connected to node 453. Bootstrap capacitor 454 is connected between conductor 378 and node 453. MOSFETs 458 and 460 are connected in parallel between node 64 and ground and have their gates connected, respectively, to nodes 424 and 01. MOSFET 462 is connected between node 424 and 463 and has its gate connected to CLK. MOSFET 468 is connected between $A_{11}$ output node 66 and node 378 ($\overline{01}'$) and has its gate connected to node 463. Bootstrap capacitor 464 is connected between nodes 378 and 463. MOSFETs 470 and 472 are connected in parallel between nodes 456 and ground and have their gate electrodes connected, respectively, to nodes 422 and 01.

Figure 9:
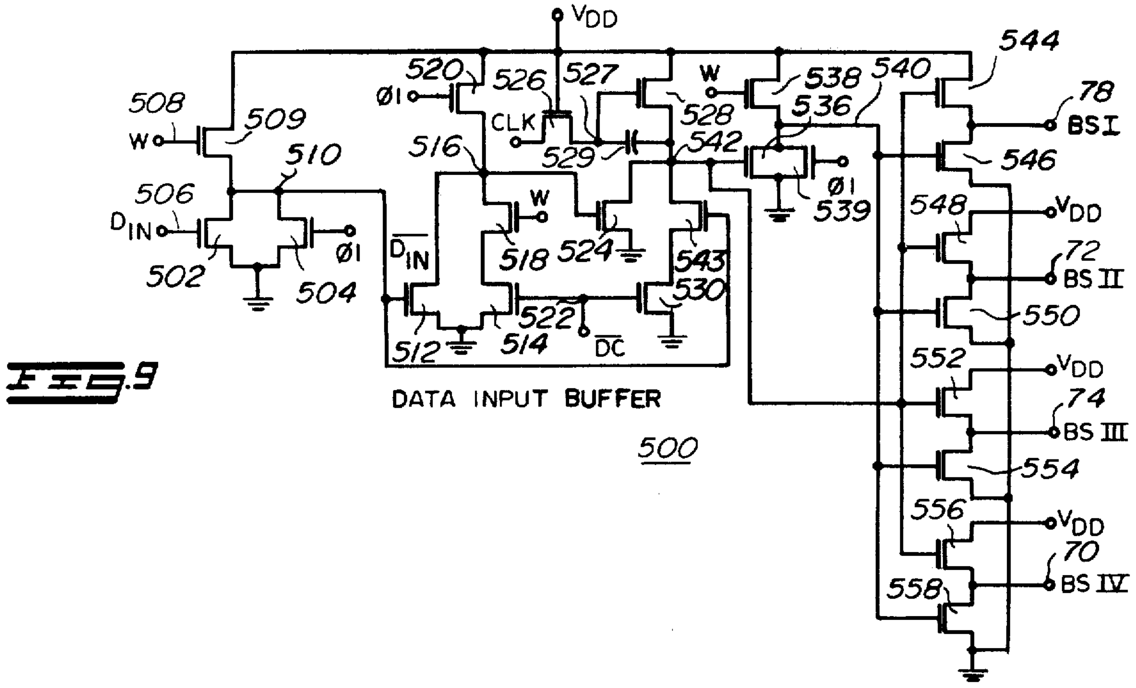
FIG. 9 is a schematic diagram of the data input buffer circuit utilizable in the memory of FIGS. 1*a* – 1*d*.

In FIG. 9, data input buffer 500 includes MOSFET 509 connected between $V_{DD}$ and node 510 having its gate connected to W conductor 508. MOSFETs 502 and 504 are connected in parallel between ground and node 510 and have their gates connected, respectively, to Data In ($D_{IN}$) conductor 506 and 01. MOSFET 520 is connected between $V_{DD}$ and node 516 and has its gate connected to 01. MOSFET 512 is connected between node 516 and ground and has its gate connected to node 510. MOSFETs 514 and 518 are connected in series between node 516 and ground, and have their gates connected, respectively, to $\overline{DC}$ (Data Control) node 522 and W node 508. MOSFET 526 is connected between CLK and node 527 and has its gate connected to $V_{DD}$. MOSFET 528 is connected between $V_{DD}$ and node 542 and has its gate connected to node 527. Bootstrap capacitor 529 is connected between nodes 542 and 527. MOSFET 524 is connected between node 542 and ground and has its gate connected to node 516. MOSFETs 543 and 530 are connected in series between node 542 and ground and have their gates connected, respectively, to nodes 510 and 522. MOSFET 538 is connected between $V_{DD}$ and node 540 and has its gate connected to W conductor 508. MOSFETs 536 and 539 are connected in parallel between nodes 540 and ground and have their gates connected, respectively, to nodes 542 and 01. MOSFET 544 is connected between BSI and $V_{DD}$ and has its gate coupled to node 542. MOSFET 546 is coupled between BSI and ground and has its gate coupled to node 540. Similarly, MOSFETs 548, 552, and 556 have their gates coupled to node 542 and are coupled between $V_{DD}$ and BSII, BSIII, and BSIV, respectively. MOSFETS 550, 554 and 558 have their gates coupled to node 540 and are coupled between ground and BSII, BSIII and BS IV, respectively.

Figure 10:
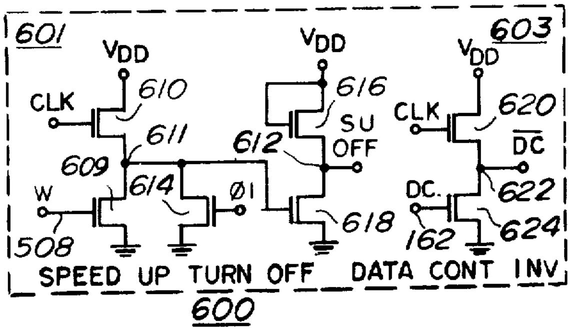
FIG. 10 is a schematic diagram of a speed-up turnoff circuit and the data control inverter circuit used in the memory of FIGS. 1*a* – 1*d*.

Section 600 in FIG. 10 includes speed-up turn-off circuit 601 and data control inverter 603. Speed-up turn-off circuit 601 includes a dynamic two-input NOR gate including load device 610 coupled between $V_{DD}$ and node 611 with gate to CLK and MOSFETs 612 and 614 coupled in parallel between node 611 and ground and having their gates coupled, respective, to W node 508 and 01. The second stage of circuit 601 includes an inverter having diode-connected load MOSFET 616 coupled between $V_{DD}$ and output node 612 and switch MOSFET 618 coupled between node 612 and ground and having its gate connected to node 611. The data control inverter includes MOSFET 620 coupled between $V_{DD}$ and node 622 having its gate connected to CLK and switch MOSFET 624 coupled between node 622 and ground having its gate connected to DC (data control).

Referring to FIG. 11, speed-up circuit 630 includes MOSFET 632 coupled between CLK and node 634 having its gate connected to $V_{DD}$. MOSFET 636 is coupled between $V_{DD}$ and node 638 and has its gate connected to node 634. Bootstrap capacitor 633 is coupled between node 634 and 638. MOSFETS 640 and 642 are coupled in parallel between node 638 and ground and have their gates connected, respectively, to node 612 and 70 MOSFET 646 is coupled between $V_{DD}$ and node 70 and MOSFET 644 is coupled between node 70 and ground and has its gate connected to node 638. MOSFET 646 has its gate connected to 01.

Figure 12:
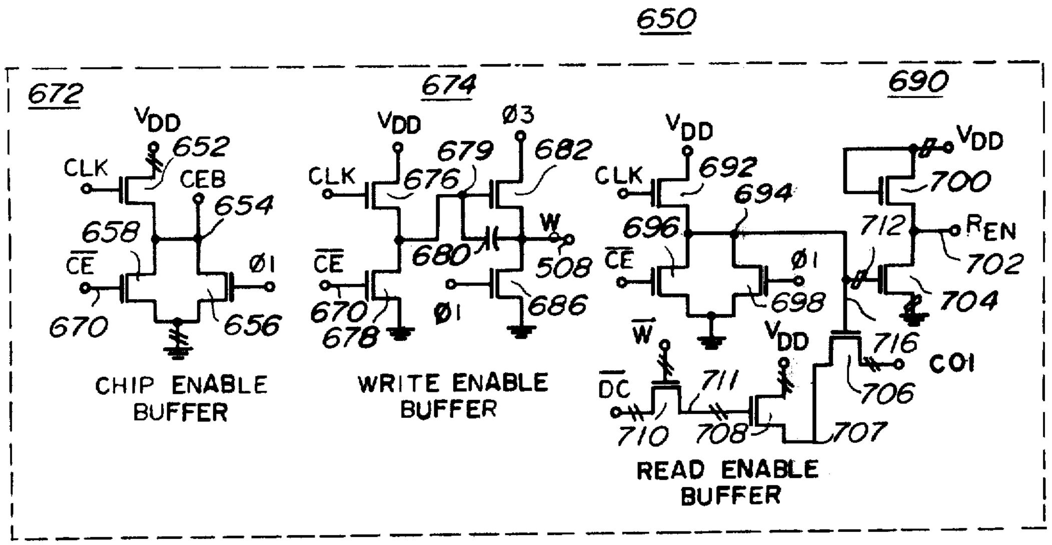
FIG. 12 is a schematic diagram of the chip enable buffer, the write enable buffer, and the read enable buffer circuits utilized in the memory of FIGS. 1*a* – 1*d*.

In FIG. 12, section 650 includes a chip enable buffer 672 which includes MOSFET 652 coupled between $V_{DD}$ and node 654 and having its gate coupled to CLK and MOSFETs 658 and 656 coupled in parallel between node 654 and ground having their gates connected, respectively, to $\overline{CE}$ and 01.

Write Enable buffer 674 includes MOSFET 676 coupled between $V_{DD}$ and node 679 having its gate connected to CLK. MOSFET 678 is connected between ground and node 679 and has its gate connected to $\overline{CE}$. MOSFET 682 is connected between 03 and node 508 and has its gate connected to node 679. Bootstrap capacitor 680 is connected between nodes 679 and 508. MOSFET 686 is connected between node 508 and ground and has its gate connected to 01. Read Enable buffer 690 includes a NOR gate including MOSFET 692 connected between $V_{DD}$ and 694 having its gate connected to CLK. MOSFETs 696 and 698 are connected between node 694 and ground and have their gates connected, respectively, to $\overline{CE}$ and 01. MOSFET 700 has its gate and drain connected to $V_{DD}$ and its source connected to node 702 which generates $R_{EN}$. MOSFET 704 is connected between node 702 and ground and has its gate coupled to node 694. Note that the small parallelograms such as 712 in the drawing indicated connections which are provided for an interconnection option and which are open-circuited to allow use of external Exclusive OR circuitry. The pairs of parallel lines such as 716 are open-circuited in the case of Exclusive OR circuitry being provided on the chip, and are short-circuited for an option in which external Exclusive OR circuitry is used.

The term "Exclusive OR type circuit" used herein refers to either an Exclusive OR or an Exclusive NOR circuit. The term Exclusive OR' in has a similar connotation.

MOSFET 706 is connected between $C_{01}$ and node 707 and has its gate connected to node 694, (CEA). MOSFET 708 is connected between $V_{DD}$ and node 707 and has its gate connected to node 711. MOSFET 710 has its gate connected to $\overline{W}$; node 746, and is connected between node 711 and $\overline{DC}$.

Figure 13:
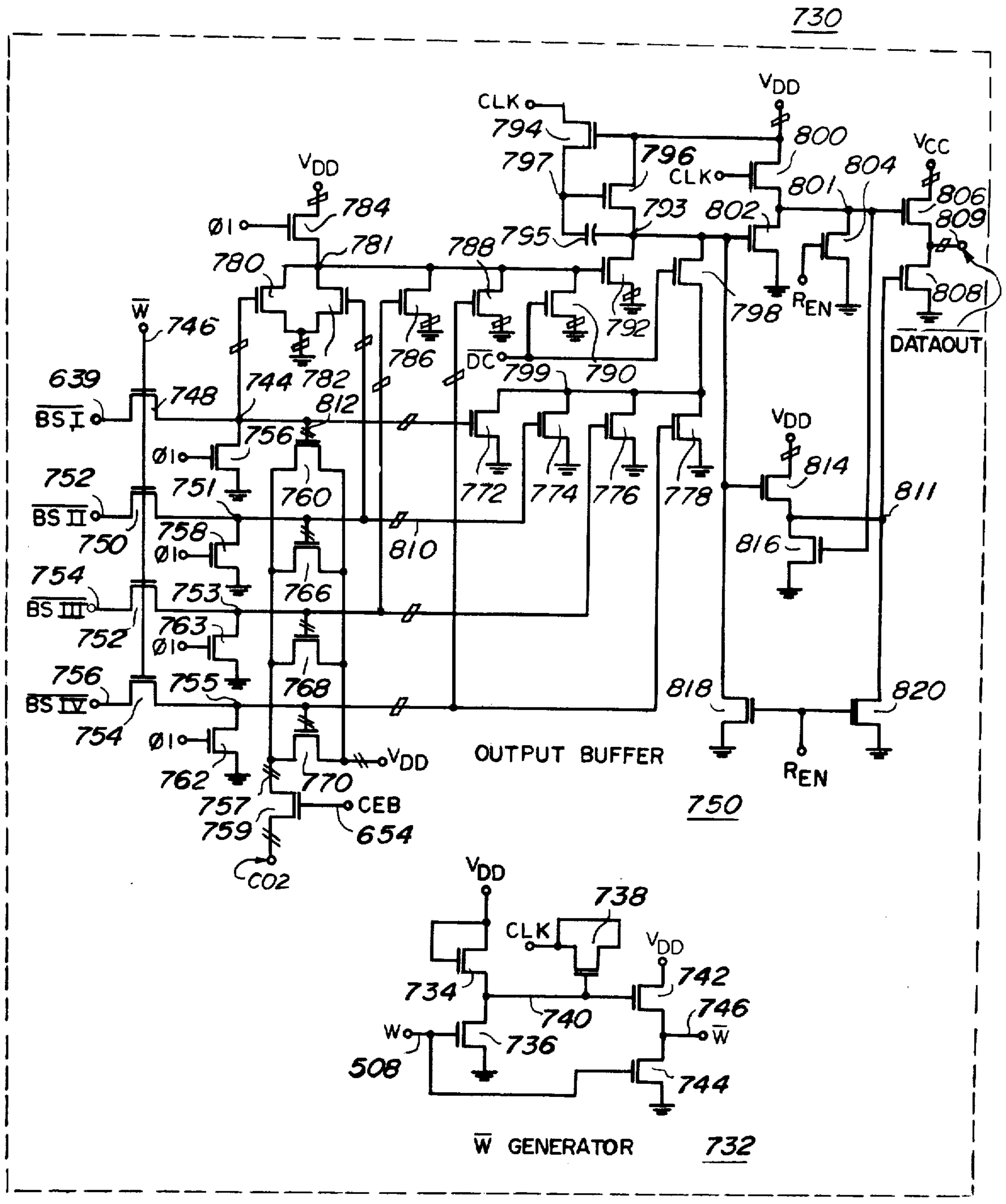
FIG. 13 is a schematic diagram of the $\overline{W}$ signal generator circuit and the output buffer circuit utilized from the memory of FIGS. 1*a* – 1*d*.

FIG. 13 shows a schematic diagram of circuit section 730 which includes W generator 732 and output buffer 750. $\overline{W}$ generator 732 includes MOSFET 734 connected between $V_{DD}$ and node 740 with its gate connected to $V_{DD}$ and MOSFET 736 connected between node 740 and ground having its gate connected to W, node 508. Bootstrap capacitor 738 is connected between CLK and node 740. MOSFET 742 is connected between $V_{DD}$ and $\overline{W}$, node 746, and has its gate connected to node 740. MOSFET 744 is connected between node 746 and ground nad has its gate connected to node 508.

Output buffer 750 accepts signals from $\overline{BSI}$ (node 639), $\overline{BSII}$, (node 752), $\overline{BSIII}$ (node 754) and $\overline{BSIV}$ (node 756). Coupling MOSFETs 748, 750, 752 and 754 couple nodes 639, 752 754 and 756, respectively, to nodes 748, 751, 753, and 755, and each have their gates connected to $\overline{W}$, node 746. MOSFET 784 is connected between $V_{DD}$ and node 781 and has its gate connected to 01. MOSFETs 780, 782, 786, 788 and 790 are coupled in parallel between node 781 and ground and have their gates connected, respectively, to nodes 744, 751, 753, 755 and $\overline{DC}$. In FIG. 13, the small parallelogram such as 810 indicates a solid connection for on-chip Exclusive OR type circuitry and an open connection for the option in which the Exclusive OR function is performed off the chip, while the closely spaced sets of parallel lines indicate a short circuit connection for off-chip Exclusive Or'ing and an open connection for on-chip Exclusive Or'ing. MOSFETs 756, 758, 760 and 762 all have their gates connected to 01 and are connected, respectively, between ground and nodes 744, 751, 753, and 755. MOSFETS 760, 766, 768 and 770 are coupled in parallel between $V_{DD}$ and nodes 757 and have their gates coupled, respectively, to nodes 744, 751, 753 and 755. MOSFET 759 is coupled between $C_{02}$ and node 757 and has its gate connected to node 654, designated CEB. MOSFET 792 is coupled between node 793 and ground and has its gate connected to node 781. Bootstrap capacitor 795 is coupled between node 797 and node 793. MOSFET 796 is coupled between $V_{DD}$ and node 793 and has its gate connected to node 797. MOSFET 794 is coupled between CLK and node 797 and has its gate connected to $V_{DD}$. MOSFET 798 is connected between node 793 and node 799 and has its gate connected to $\overline{DC}$.* MOSFET 800 is connected between $V_{DD}$ and node 801 and has its gate connected to CLK. MOSFET 802 has its gate connected between node 801 and ground and has its connected to node 793. MOSFET 804 is connected between nodes 801 and ground and has its gate connected to $R_{EN}$. MOSFET 806 is connected between $V_{CC}$ AND DO (Data Out) output node 809 and has its gate connected to node 801. MOSFET 808 is connected between 809 and ground and has its gate connected to node 811. MOSFET 814 is connected between $V_{DD}$ and node 811 and has its gate connected to node 793. MOSFET 816 is connected between node 811 and ground and has its gate connected to node 801. MOSFET 818 is connected between node 793 and ground and has its gate connected to $R_{EN}$. MOSFET 820 is connected between node 811 and ground and has its gate connected to $R_{EN}$.

*MOSFETS 722, 774, 776, and 778 are coupled in parallel between ground and node 799 having their gates connected respectively, to nodes 744, 751, 753, and 755.

Figure 14:
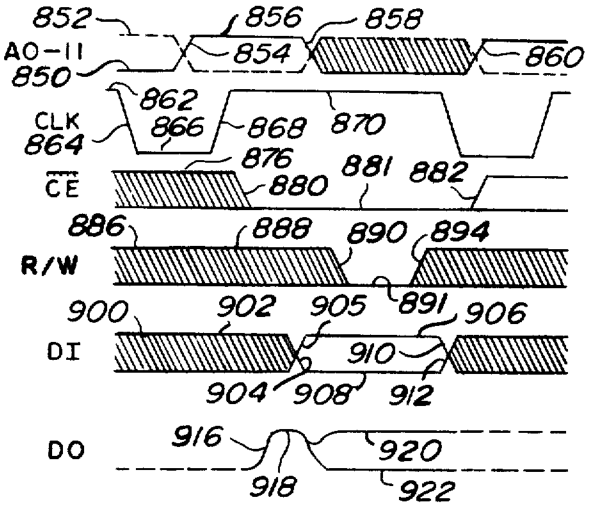
FIG. 14 is a timing diagram depicting the external signals applied to and received from the memory of FIGS.

FIG. 14 is a diagram depicting the signals at the external connections of the MOS RAM system shown in FIGS. 1*a*–1*d*. The waveforms in FIG. 14 indicate a read-write cycle. A brief description of the operation of the 4096 bit dynamic MOS RAM follows, referring to the timing diagram of FIG. 14. The RAM uses three transistor storage cells in an inverting cell configuration. The single high-level clock, CLK, starts an internal three phase clock generator circuit which controls the read and write functions of the device. The 01 signal, which is high when CLK is low (stand-by mode) preconditions the nodes in the dynamic RAM in preparation for a memory cycle. The 02 signal, which comes on as CLK goes high is the read control signal and transfers data from memory cell storage onto bit sense lines. The 03 signal, which comes after 02 only during a write or refresh cycle, transfers data drom the bit sense lines back into storage. The 03 signal occurs only when the R/W input is low.

To perform a read cycle, CLK is brought high to initiate a 02 signal. The X decoders select one column in each of the four storage quadrants (FIGS. 1*a*–1*d*). The Y deconder selects one of the 128 bit sense lines for read and write operation. During the 02 signal, the data on this selected bit sense line is Exclusive OR'ed with the state of the appropriate data control cell to supply the correct output data. After this data is received by the external system, CLK may be brought low to the stand-by position. This assumes that the R/W signal is being held high to prevent any internal 03 pulse from being generated.

To perform a write or refresh operation, CLK is brought high and everything is identical to a read operation up to the point at which the 128 bit sense lines are charged by the selected storage cells in the selected columns. When R/W is brought low (if it is not already low) a 03 signal is generated after 02 is over. The 03 signal takes the data from the 128 bit sense lines and returns it to the 128 storage locations it came from. Because of the design of the memory array, this 02-03-read-write operation inverts the data. Therefore, one extra row of memory cells, called data control cells, is used to keep track of the polarity of the stored data in each column of storage cells in order to correctly recover it. During the write operation, the input data is Exclusive OR'ed with the control cells before being stored in the array. The refresh cycle does not modify any of the bit sense lines, but simply returns the data, (now inverted) into storage. All timing signals for the MOS RAM are specified around these operations. The following is a brief description of the input signals, the output signals, and relevant timing requirements, referring to FIG. 14.

CLK is a single clock which initiates all memory cycles. CLK can remain either OK high or low as long as desired for specific operations as long as a minimum refresh requirement is met.

The $\overline{CE}$ signal controls only the input/output buffers. When $\overline{CE}$ is high, the input is disconnected and the output is in the tri-state or high impedance state. Therefore, a refresh cycle is essentially a write cycle with $\overline{CE}$ high.

R/W (read/write), when high, inhibits an internally generated 03 signal for writing. When R/W is low, a 03 pulse will occur soon after 02 goes low. If 02 is already finished, as in a ready-modify-wirte cycle, 03 will start at once. For a write cycle, an overlap of CE, CLK, and R/W is required, an overlap of CLK and R/W is required for a refresh cycle.

Signals on the Data In line are ignored when either $\overline{CE}$ or R/W is high, or CLK is low. $D_{IN}$ (data in) must be held valid for sufficient time to override the data stored on the selected bit sense line. The preset line (PS) during normal use, is tied to ground. However, during device testing PS can be used to preset the data control cell to a logical "0". A 2 microsecond pulse will set all 32 cells simultaneously, and insure a good logic level in the data control cells after the first power up transition. In system use, a good logic level will come naturally after the first few refresh cycles, but use of the preset input is very valuable in testing the devices.

The MOS 4096 bit RAM is refreshed by performing a refresh or a write cycle on each of the 32 combinations of the five least significant address bits $A_0 - A_4$ within a 2 millisecond time period. This can be done in a burst mode or a distributed mode. A refresh abort can be accomplished by treating a refresh cycle as a read-modify-write cycle with $\overline{CE}$ high. This type of cycle can be aborted at any time until the R/W signal has been brought low to allow the 03 clock to begin.

The operation of the internal clock generating circuitry is described with reference to the timing diagrams of FIGS. 14 and 15. The externally applied signal, CLK, is shown in both FIGS. 14 and 15. In one practical implementation of the MOS RAM in which $V_{DD}$ is 12 volts and $V_{SS}$ is ground or zero volts, CLK has a 12 volt logic swing. In order to describe the operation of the 01 generator circuit in FIG. 2, the operation of the $01_F$ generator circuit in FIG. 2, the operation of the $01_F$ generator of FIG. 7 must also be described. Assume initially that CLK is high, that is, at approximately $V_{DD}$ volts. Then, referring to FIG. 7, $01_F$, node 232, is approximately at ground because MOSFETs 234 and 246 are both on. Node 242 is also at ground, being held at ground by MOSFET 234, and consequently MOSFET 248 is off. MOSFETT 244 is an optional high impedance load device provided to given an added margin of safety. Since node 242 is at ground, bootstrap charging MOSFET 238 maintains at its source a voltage equal to $V_{DD}$-$V_{TH}$ volts and causes bootstrap capacitor 240 to be charged to this voltage. Referring to FIG. 2, 01, node 226, is approximately at ground because MOSFETs 200, 208, 210 and 202 are all on. MOSFET 220 maintains node 228 at $V_{DD}$-$V_{TH}$ volts, holding MOSFETs 202 and 210 on. MOSFET 222 is off since $01_F$ is at ground. CLK also maintains MOSFET 224 in the on condition, so that node 219 is at ground. Then, the only DC path between $V_{DD}$ and ground is through MOSFETs 216 and 224, both of which may be relatively high impedance devices, so that very low power dissipation results for the generator 198 when CLK is high. MOSFET 204 is an optional high impedance leakage device comparable to MOSFET 244 in FIG. 7. MOSFETs such as 202, 200, etc., which are connected between an output node and ground, may be referred to as switch MOSFETs or pull-down MOSFETS. The portion of the circuit of FIG. 7 including switching MOSFET 234, load MOSFET 236, bootstrap charging MOSFET 238, and bootstrap capacitor 240 is well known in the art and is described herein as a bootstrap inverter circuit. The output circuit portion thereof, including load MOSFET 248 and switch MOSFET 246 is referred to as a push-pull driver circuit and the combination of the push-pull driver circuit and the bootstrap inverter circuit is referred to herein as a bootstrap driver circuit. However, the term bootstrap driver circuit is frequently also used to designate other drive circuits which have an active load device having its gate coupled to a bootstrap capacitor.

As the leading edge 930 of CLK goes from $V_{DD}$ to ground, MOSFETs 202, 208 and 224 in FIG. 2 are turned off, and node 219 is charged by MOSFET 216 toward $V_{DD}$. MOSFET 220 is also turned off, but charge capacitively stored on node 228 keeps MOSFET 210 in the on condition for a delay period generated by $01_F$ generator 230 so that bootstrap capacitor 214 is charged up. Referring to FIG. 7, MOSFETs 234 and 246 are turned off during transition 930 of CLK, and load MOSFET 236 pulls node 242 to $V_{DD}$ and $01_F$, node 232, undergoes transition 939 in FIG. 15 to approximately $V_{DD}$-$V_{TH}$ edge of CLK and the leading edge of $01_F$ may be approximately 20 nanoseconds or so; however, the time to charge up bootstrap capacitor 214 may be only approximately 10 or 15 nanoseconds, so that adequate charging of the bootstrap capacitor 214 occurs efficiently. When $01_F$ goes positive, MOSFET 222 is turned on, node 228 is pulled to ground, MOSFET 210 is turned off, and MOSFET 212 pulls node 218 to $V_{DD}$. Bootstrap capacitor 214 boosts the voltage at node 219 to a voltage which may be substantially more positive than $V_{DD}$, providing a large magnitude drive voltage to MOSFET pull-up device 204, which generates a rapid rise time at node 226 for 01, which undergoes transition 944, even when loaded by a substantial capacitance.

According to the invention, the greatly improved power dissipation of 01 generator circuit 198 is achieved by combination of that circuit with the $01_F$ generator circuit 230, which generates the delay between CLK and $01_F$ which allows charging up bootstrap capacitor 214. In one implementation of the invention, the delay between the trailing edge 930 of CLK and the leading edge 944 of 01 is approximately 35 nanoseconds.

The level of 01 during waveform section 945 in FIG. 15 is approximately $V_{DD}$ volts. During the positive transition 932 of CLK, CLK returns to $V_{DD}$ volts, turning on MOSFETs 202, 208, 224, 234, and 246 in FIGS. 2 and 7, pulling nodes 226, 218, 219, 242, 232, respectively, to ground. This causes $01_F$ to undergo transition 941 and 01 to undergo transition 946. Hence, MOSFETs 280, 290 and 294 are initially off. Node 260 of decorder discharge circuit 252 is initially high so that MOSFETs 278 and 296 or 02 generator 276 are on. When CLK goes positive during transition 932, MOSFET 286 is turned on and node 285 is therefore pulled toward $V_{DD}$ and consequently bootstrap capacitor 284 is charged up. As described above, one of the address inputs $A_{10}$ or $\overline{A_{10}}$ goes positive, discharging node 260 to indicate when the decoding process is complete and at that time MOSFETs 278 and 296 of 02 generator 276 are turned off, and nodes 281 and 300 are free to rise. Node 281 is pulled toward $V_{DD}$ by MOSFET 282 and the voltage at node 285 is substantially boosted by bootstrap capacitor 284 which causes a large gate to source voltage to be applied to MOSFET 292 which in turn pulls 02, node 300, toward $V_{DD}$ causing 02 transition 962 in FIG. 15. Next, when the sensing of the selected storage cell of the RAM is complete, node 272 of the timing delay circuit 262 rises as the timing bit sense line 152 is discharged, turning on MOSFETs 280, 290, and 294 of 02 generator 276, which pulls nodes 281, 285 and 02, node 300, to ground causing 02 transition 964. 02 stays at level 965, FIG. 15, until the next time the dummy decoder discharge circuit 252 is activated, discharging node 260 to ground.

The subsequent discussion is made with reference to FIG. 5 and describes the operation of the circuitry which generates the internal 03 clock signal. (It should be noted that the worst case storage cell sensing situation is simulated by providing the timing control discharge devices at the far end of the RE lines and by providing additional capacitive loading on the timing bit sense line 152.) As was mentioned earlier, a 03 pulse is generated only during a write cycle. The circuitry required to generate the 03 pulse is illustrated in FIG. 5. Referring to FIG. 5, the 03 generator 308 requires input signals from the R/W generator 304 and the $01_{FF}$ generator 306.

Referring to FIG. 14, it is seen that during a read cycle R/W is at a logical "1" and during a write cycle R/W is at a logical 0. Referring to R/W generator 304, it is seen that when CLK is high, the logic level at node 316 is inverted at node 318 being designated R/W'. Thus, during a read cycle, R/W' is high, and MOSFETs 342 and 352 of 03 generator 308 are one, so that 03, node 353, is at ground, as is node 355.

Referring to $01_{FF}$ generator 306, it is seen that $01_{FF}$ is simply the inverse of CLK, a bootstrap inverter is utilized to give a fast rise time to $01_{FF}$ and a large magnitude logic swing equal to $V_{DD}$ volts. Thus, when CLK goes high, $01_{FF}$ goes to ground, and MOSFETs 344 and 346 of 03 generator 308 are turned off. The signal $01_{FF}$ is designed to be faster than 01, so that during transition 930 of CLK, $01_{FF}$ goes through a comparatively fast transition 934 which turns MOSFETs 344 and 346 on rapidly and discharges node 355 and 03, node 353, to ground rapidly before the occurrence of leading edge 944 of 01, eliminating the possibility of any overlap between the trailing edge of 03 and the leading edge of 01. The leading edge of 03 is controlled by the timing control device circuit 262 of FIG. 4, and is connected to node 274 designated $\overline{TCD}$, which is discharged to ground by the signal on node 272 when sensing of the worst case storage cell is complete. The discharge of node 274 is somewhat delayed from the charging up of node 272 so that the trailing edge 964 of 02 has reached level 965 (FIG. 15) before the leading edge 984 of 03 is initiated. When the signal on node 274 is discharged to ground, MOSFETs 340 and 350 of 03 generator 308 in FIG. 5 are turned off. Bootstrap capacitor 336 was charged up during CLK transition 932, so that as MOSFET 330 pulled node 355 toward $V_{DD}$, bootstrap node 333 is boosted to a voltage which may be substantially higher than $V_{DD}$, and MOSFET 334 is turned on hard providing a fast rise time of 03, node 353, causing transition 984, FIG. 15. As previously mentioned, the $01_{FF}$ transition 934 causes 03 to go to ground; this is indicated if FIG. 15 by transition 962 of 03.

Referring to FIG. 9, the operation of the circuitry which cooperates to generate 02 is next described. The leading edge 957 of 02 is controlled by the dummy decoder discharge circuit 252 in FIG. 4. Dummy decoder discharge circuit 252 is merely a clocked two-input NOR gate, the operation of which is well known. However, the configuration of waveform A, at node 260, is dependent on the waveforms at $A_{10}$ and $\overline{A_{10}}$ which may be connected to the outputs of the $A_{10}$ address buffer, which is similar to or identical to the address buffer shown in FIG. 3. The operation of the address buffer of FIG. 3 is similar to the operation of that described in the Hoffman et al patent previously mentioned herein.

Figure 3:
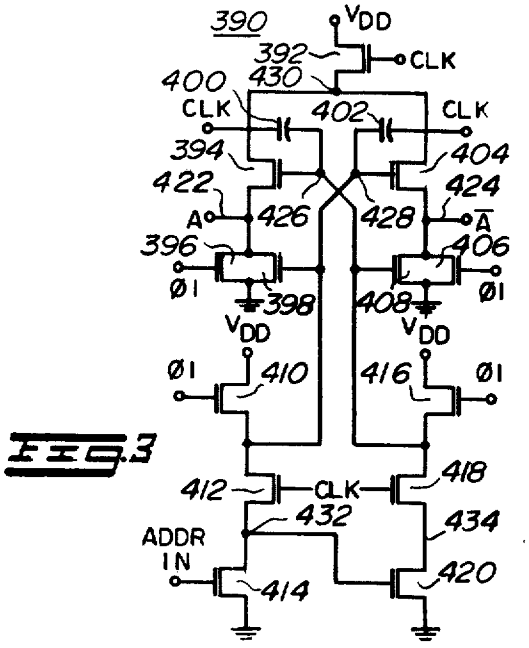
FIG. 3 is a schematic diagram of an address input buffer according to an embodiment of the invention.

Referring to FIG. 3, the operation of the address buffer is described to illustrate the derivation of the signals D1 and D2 applied to the dates of the dummy decoder discharge circuit 252. Initially, when 01 is high, MOSFETs 396 and 406 are turned on, so that A, node 422, and $\overline{A}$, node 424, stay at ground until CLK undergoes transition 932. Referring to FIG. 14, it is seen that the address inputs $A_0 - A_{11}$ undergo a transition 854 prior to the positive edge of CLK, which in FIG. 14 is designated by numeral 868, which corresponds to transition 932 in FIG. 15. During 01, MOSFETs 410 and 416 are on, so that nodes 426 and 428 are high. Since CLK is low, MOSFETs 412 and 418 are off. Depending on the level of the address input, which may be $A_{10}$, MOSFET 414 may be either on or off. When CLK goes high, transition 932, 01 goes low during transition 946, as previously described. Nodes 426 and 428 are substantially boosted by bootstrap capacitors 400 and 402; due to charge sharing between the bootstrap capacitors 400 and 402; due to charge sharing between the bootstrap capacitors 400 and 402 and the capacitances associated with nodes 432 and 434, and also due to the fact that MOSFETs 412 and 418 are now on, since CLK is high at level 933, nodes 432 and 434 are charged toward $V_{DD}$. If the address input applied to the gate of MOSFET 414 is high, MOSFET 414 is on, and nodes 432 and 428 are discharged toward ground and consequently MOSFET 420 is turned off. Nodes 434 and 426, on the other hand, stay high, and node 422, output A, is charged toweard $V_{DD}$ through MOSFET 432 as indicated in FIG. 15 by 954 in the $A_{10}$ or $\overline{A_{10}}$ waveform of FIG. 15. MOSFET 404 is off, so that $\overline{A}$, node 424, stays at ground.

Conversely, if the address input applied to the gate of MOSFET 414 is low, MOSFET 414 is off, so that node 432 stays high during CLK due to the above described chargesharing process so that MOSFET 420 is turned on and discharges nodes 434 and 426. MOSFET 394 is therefore turned off while MOSFET 404 remains on, so that $\overline{A}$, node 424, is charged to $V_{DD}$ through MOSFET 392 and node 422, A, stays at ground.

Referring back to FIG. 4, output 260 of dummy decoder discharge circuit 252 is pulled to ground in response to transition 954 of either $A_{10}$ or $\overline{A_{10}}$ (FIG. 15). The signal at node 260 controls the leading edge of 02, which is produced at node 300 of 02 generator 276. It should be noted that initially 02, node 300, is held at ground by MOSFET 298 when 01 is high. Next, it is necessary to consider the operation of the timing control delay circuit 262 to determine the initial voltage on node 272, which is connected to MOSFETs 280, 290, and 294 of 02 generator 276. Timing control delay circuit 262 has the gate of MOSFET 266 connected to timing bit sense line 152. Timing bit sense line 152 is connected to timing control device 146 of FIG. 1*a*. The geometries of MOSFETs 148 and 150 and the value of reference voltage $V_{REF}$ are designed so that timing bit sense line 152 is discharged in a time approximately equal to or related to the discharge time for the worst case storage cell in the entire RAM and is therefore a reliable indicator of when the sensing process is complete for the selected storage cell, so that 02 is no longer needed. This signal is used by timing control delay circuit 262 and 02 generator 276 to initiate the trailing edge 964 of 02. Returning now to timing control delay circuit 262, it is clear that node 272 is initially near ground during 01 until timing bit sense line 152 is discharged to ground.

The remaining clock signal to be described is $\overline{01}'$, which is generated by the $\overline{01}'$ generator 360 in FIG. 6. As mentioned previously, the $\overline{01}'$ signal is utilized in conjuntion with address buffer 11 shown in FIG. 8 to select either the right or left-hand half of the memory of FIGS. 1*a* – 1*d*. This selection requires a signal delay sufficiently to allow complete selection of the proper rows and colums in the respective half arrays. Referring to FIG. 6, it is seen that a signal on node 376 is precharged during 01 by MOSFET 368. After CLK undergoes transition 932, FIG. 15, one of the lines $A_3$ or $\overline{A_3}$, which are initially set to ground during 01, as explained previously with reference to FIG. 3, will go high, discharging node 376 to ground. Some delay will occur between CLK transition 932 and the discharge of 376 to ground during which bootstrap capacitor 374 will be charged through MOSFET 370. When node 376 is discharged, MOSFET 372, producing transition 989 of FIG. 15. The various node capacitances and MOSFET geometries are designed to produce the desired delay between CLK and $\overline{01}'$ in order to allow column and row decoding in the memory array to be completed prior to selection of the left-hand or right-hand side thereof. By the time that nodes 422 and 424 of FIG. 8 have achieved their predetermined voltage values, one being high and the other being low. For example, node 422, $A_{11}'$, may be high (i.e., at a high voltage) and $\overline{A_{11}}'$, node 424, may be at ground. Then, by virtue of MOSFETs 452 and 462, respectively, node 453 is high and node 463 goes low and therefore MOSFET 456 is turned on and MOSFET 468 is turned off. It should be noted that $A_{11}$, node 64, and $\overline{A_{11}}$, node 66, were present to ground during 01 by MOSFETs 460 and 472, respectively, causing transition 987 in FIG. 15. Bootstrap capacitor 454 is charged up when node 422 goes positive. Then, when $\overline{01}'$ goes positive, transition 989, $A_{11}$, node 64, rises selecting the desired half-array of the RAM. $A_{11}$, node 66, stays at ground since MOSFET 468 is off and also since MOSFET 470 is on by virtue of node 422 being high. Additional gate-to-source drive voltage is provided to MOSFET 456 by bootstrap capacitor 454 to provide a fast rise time to $A_{11}$, node 64. If address buffer 11, reference numeral 450 of FIG. 8, had been in the opposite state, then $A_{11}$ would have remained at ground and $\overline{A_{11}}$ would have been driven to a high level, and the circuit operation would have been reversed between the left and right-hand sides of address buffer 11.

The operation of bit sense line speed-up circuit 630 in FIG. 11 is described in conjunction with the operation of speed-up turn-off circuit 601 in FIG. 10, the operation of which is described in conjunction with the description of the operation of Write/Enable buffer 674 in FIG. 12. The purpose of the speed-up circuit 630 is to decrease the access time of RAM by detecting when the selected storage cell in the memory array has begun to discharge the bit sense line, such as bit sense line 34 in FIG. 1a, and the quadrant bit sense line coupled thereto, such as BSIV, node 70, and to speed up the remainder of the discharging process.

Once the potential of one of the quadrant bit lines BSI, BSII, BSIII, BSIV, nodes 78, 72, 74 and 70, respectively, is sufficiently discharged to insure that the noise margin limits are exceeded, a speed-up circuit 630, one for each quadrant bit sense line, cuts in and rapidly completes the discharge of the particular quadrant bit sense line connected thereto to ground, greatly reducing the access time of the RAM. The great decrease in access time is due to the fact that the horizontal array bit sense lines, such as 34, 38, 42, or 46, FIGS. 1*a* – 1*d*, and the particular quadrant bit sense lines coupled thereto under certain conditions have a large amount of capacitance and the driving capability of a selected storage cell is relatively low due to its small size. Speed-up circuit 630, FIG. 11, is essentially a modified cross-coupled latch circuit.

Referring to FIG. 1*a*, assume initailly, for purposes of description of the operation, that bit sense line 34 and quadrant bit sense line BSIV, node 70, are precharged to $V_{DD}-V_{TH}$ during 01 (by MOSFET 646 of FIG. 11). Also assume that during the early part of 02, the selected memory cell 24, FIG. 1*a*, has discharged both horizontal array bit sense line 34 and quadrant bit sense line BSIV, node 70, by several volts. Coupling MOSFET 62, FIG. 1a, will then be on since it is selected by Y decoder/driver 50. Referring to FIG. 11, it is noted that BSIV, node 70, is connected to speed-up circuit 630. (It should be noted that herein $V_{TH}$ is the threshold voltage of the particular MOSFET under discussion). Referring to FIG. 10, it is seen that speed-up turn-off circuit 601 has node 611 thereof set to ground potential during 01, so that MOSFET 618 is off and MOSFET 616 therefore keeps node 612 at $V_{DD}-V_{TH}$, which in turn keeps MOSFET 640, FIG. 11, in the on condition, so that node 638 is at ground, and MOSFET 644 is off. Since W, node 508 of Write Enable buffer 674, FIG. 12, was set to ground during 01 by MOSFET 686, MOSFET 612 of FIG. 10 is off. Therefore, node 611 is charged to $V_{DD}-V_{TH}$ by MOSFET 610 when CLK undergoes transition 932, FIG. 15. This turns MOSFET 618 on, which pulls node 612 to ground, which in turn turns off MOSFET 640, FIG. 11. Meanwhile, during CLK transition 932, MOSFET 632 turned on and charged up node 634, which charged up bootstrap capacitor 633 and also turned on MOSFET 636. As MOSFET 640 is turned off, the only thing then holding node 639 near ground is MOSFET 642, the gate of which is connected to BSIV, and which is designed so that when BSIV, node 70, is at a desired threshold voltage below the noise margin limit which insures that the state of the selected storage cell is being sensed, node 639 begins to rise sufficiently to start turning MOSFET 642 on, and speed-up circuit 630, which as mentioned previously is essentially a latch, regeneratively switches states, and BSIV, node 70, is rapidly discharged the rest of the way to ground and the internal sensing of the stored state in the selected storage cell is complete. If the state of the selected storage cell is such that BSIV remains at $V_{DD}-V_{TH}$ the speed-up circuit 630 does not regeneratively switch states in the manner described above.

According to the invention, signal 612 is provided in FIG. 10 so that MOSFET 640 of speed-up circuit 630, FIG. 11, will be in an on condition during a write cycle; then MOSFET 644 will be off and the data input circuit 500, FIG. 9, will not have to overpower MOSFET 644 of each of the four speed-up circuits in the RAM in order to write a high level onto any one of the quadrant bit sense lines. Therefore, speed-up circuit 630 in FIG. 10, in conjunction with the speed-up turn-off circuit 601 in FIG. 12 and Write Enable buffer 674 in FIG. 12 accomplish the task of greatly speeding up sensing, yet permitting a fast, low power write cycle as well as a read-modify-write cycle.

Referring to FIG. 9, data input buffer 500 provides the necessary Exclusive OR type function on the data input signal applied to the RAM and the date control signal generated by the data control register of an inverting cell type RAM. The data control signal DC on node 162 is inverted by data control inverter 603 in FIG. 10, which produces $\overline{DC}$ at node 622 during CLK. During 01 DC is precharged to $V_{DD}-V_{TH}$ so that MOSFET 624 is on and $\overline{DC}$, node 622, is near ground. Referring to Write Enable buffer 674, FIG. 12, it is seen that when $\overline{CE}$ is at ground, node 679 will be high during CLK and during 03 W, node 508, will also be high and the RAM chip will be "enabled" or "selected". Conversely, if $\overline{CE}$, node 670, is high, W will remain at ground during 03.

Referring to Fig. 9, the following discussion explains how data input buffer 500 performs an Exclusive OR type of function. The inverter including MOSFETs 509, 502 and 504 produces the signal $\overline{D_{IN}}$ at node 510 during 03 if the RAM is selected, and it dissipates very little DC power since 01 and W are never high at the same time and also because 03 normally has a relatively narrow pulse width. The circuit including MOSFETs 520, 518, 512 and 514 is a dynamic two-input NOR gate, so that the signal $\overline{DIN + \overline{DC}}$ appears at node 516. MOSFET 518 prevents node 516, which is precharged during 01, from being discharged before 03, since $\overline{DC}$ is precharged prior to 03 by CLK. The circuit including MOSFETS 524, 530, 543, and 527 is a combinational logic gate which produces the signal $\overline{\overline{DC} + \overline{D_{IN}}} + \overline{DC}$ . $\overline{\overline{D_{IN}}}$ at node 543, which is the Exclusive NOR of $\overline{D_{IN}}$ and $\overline{DC}$. This signal is inverted by the inverter including MOSFETS 534, 536 and 538 so that the Exclusive OR of $\overline{D_{IN}}$ and $\overline{DC}$ is produced at node 540 during 03 of a write cycle if the RAM chip is selected. The output buffers provide isolation of the four quadrant bit sense lines BSI, BSII, BSIII, BSIV and also provides a sufficient amount of output current drive to rapidly charge up the respective capacitances associated with the four quadrant bit sense lines.

Referring to FIG. 13, the output buffer circuit 750 in section 730 performs an Exclusive OR type function on the four quadrant complement bit sense lines $\overline{BSI}$, $\overline{BSII}$, $\overline{BSIII}$, and $\overline{BSIV}$ (nodes 639, 752, 754 and 756, respectively) and $\overline{DC}$ in essentially the same manner that data input buffer 500, FIG. 9, operates on $\overline{D_{IN}}$ and $\overline{DC}$. $\overline{W}$ generator 732, FIG. 13, produces $\overline{W}$ at node 746, which is coupled to the gates of MOSFETs 748, 750, 752 and 754 which isolate the four quadrant complement bit sense lines from the remaining portions of output buffer 750 during a write cycle. $\overline{W}$ generator circuit 732 has as an input the signal W applied at node 684 and is generated by the Write Enable buffer 674, FIG. 12. W is equal to the logical product of $\overline{CE}$ and 03 and is equal to a logical 1 during a read cycle and a logical 0 during a write cycle. Therefore, during a write cycle, MOSFETs 736 and 744 are on and $\overline{W}$, node 746, is at ground. During a read cycle, W is near ground, so MOSFETs 736 and 744 are off prior to the edge 932 of CLK. Thus, node 740 is charged to $V_{DD}-V_{TH}$ prior to transition 932, FIG. 15, of CLK. Bootstrap capacitor 738 substantially boosts the voltage on node 740 during transition 932 of CLK, providing a substantial amount of overdrive voltage to pull-up MOSFET 742, which charges node 746 to $V_{DD}$ volts.

As previously mentioned, there are a plurality of small parallelograms drawn across various connections in FIGS. 12 and 13, such as parallelograms 712 in FIG. 12 and 810 in FIG. 13. There are also a plurality of closely spaced pairs of parallel lines such as spaced pair 716 in FIG. 12, in FIGS. 12 and 13 drawn across various connections. These parallelograms and pairs of spaced parallel lines are drawn to indicate the connections which may be provided or omitted by means of different metal masking options on a MOS RAM chip to provide the Exclusive OR Function on the chip or to provide output signals from the chip which may be processed by external Exclusive OR circuitry, such as bipolar Exclusive OR circuits, to produce the desired data output signal representative of the stored state of the selected storage cell on the MOS RAM. The parallelograms present connections which are solid for the option which provides on-chip Exclusive OR type output circuitry and broken connections for external Exclusive OR type circuitry. Similarly, the pairs of spaced parallel lines indicate broken connections for the option which provides on-chip Exclusive OR type output circuitry and solid connections for the option which provides external Exclusive OR type output circuitry.

The operation of the option shown in FIGS. 12 and 13 which provides on-chip (on the MOS RAM chip, that is) Exclusive OR type output circuitry can be understood by recognizing that during a read cycle, MOSFETs 748, 750, 752 and 754 are on, so that the voltages on the quadrant complement bit sense lines $\overline{BSI}$, $\overline{BSII}$, $\overline{BSIII}$, $\overline{BSIV}$ are coupled to the gates of MOSFETs 780, 782, 786, and 788, which act as the input MOSFETs of a clocked NOR gate including them and load MOSFET 744. Thus, a logical signal which appears at node 781, the output of the above-mentioned NOR gate, is represented by the Boolean expression $\overline{\overline{BSI} + \overline{BSII} + \overline{BSIII} + \overline{BSIV} + \overline{DC}}$. It will be noted that the circuit including load MOSFET 796, and switching MOSFETS 792, 798 and 772, 774, 776 and 778 is a combinational logic gate which produces at its output, node 744, the signal represented by the logical expression:

$$\overline{\overline{\overline{BSI} + \overline{BSII} + \overline{BSIII} + \overline{BSIV} + \overline{DC}} + (\overline{BSI} + \overline{BSII} + \overline{BSIII} + \overline{BSIV} \,.\, \overline{DC})}$$

This latter expression will be recognized as the Exclusive NOR of $\overline{DC}$ and the four quadrant complement bit sense line signals.

The bootstrap load circuitry in output buffer 750 including MOSFETs 794 and 796 and bootstrap capacitor 795 is described. It should be noted that this type of bootstrap circuit is also used in FIGS. 6 and 11. The operation is essentially as follows. Referring to FIG. 13, the output node 744 is held at ground prior to rising edge 732 of CLK, FIG. 15. In output buffer circuit 750, MOSFET 792 is turned on during 01 to accomplish this purpose. During CLK transition 932, MOSFET 794 charges up bootstrap node 797 to $V_{DD}-V_{TH}$ volts, thereby charging bootstrap capacitor 795. When MOSFET 792 is turned off, output node 744 starts to rise and bootstrap capacitor 795 boosts the voltage of 797 to maintain a relatively constant gate to source voltage across MOSFET 796. Node 744 therefore rises rapidly to $V_{DD}$ volts. The circuit thus provides a clocked bootstrap load device which dissipates virtually no DC power when CLK is low.

Referring to FIG. 12, it is seen that for the option in which the Exclusive OR function of output buffer 750 is utilized on the MOS RAM chip, MOSFETs 706, 708 and 710 are disconnected for a Read Enable buffer 690. Also chip enable buffer 672 is disconnected from $V_{DD}$ and $V_{SS}$. In FIG. 13, MOSFETs 764, 766, 768, 770 and 759 are disconnected from circuit operation. However, when the Exclusive OR type output circuitry is provided external to the MOS RAM chip, the above-mentioned MOSFETs are operatively connected rather than disconnected, and instead MOSFETS 700 and 704 in Read Enable buffer 690, FIG. 12, are disconnected as are the above-mentioned NOR gate and combinational logic gate of output buffer 750 is also disconnected for the external Exclusive OR function. Operation of the connected output circuitry for this option is as follows. Referring to FIG. 12, during a write cycle $\overline{DC}$ is isolated from $C_{01}$ (which is provided as an output of the MOS RAM) by MOSFET 710, which has its gate connected to $\overline{W}$, node 746, and is therefore in the off condition. During a read cycle, MOSFET 710 is on, and a signal representative of the voltage on $\overline{DC}$ is produced at node $C_{01}$. Referring to output buffer 750, during a read cycle, if one of the four quadrant complement bit sense lines $\overline{BSI}$, $\overline{BSII}$, $\overline{BSIII}$, OR $\overline{BSIV}$ is high, a corresponding one of MOSFETs 764, 766, 768 or 770 will be turned on and an output current will flow through that MOSFET and MOSFET 759 and out of node $C_{02}$, which is an external connection to the MOS RAM.

What is claimed is:

1. A semiconductor chip including a fully decoded MOS memory system including a plurality of memory cells, a row decoding circuit, a plurality of address buffer circuits, a data input circuit, and a data output circuit comprising:

X subarrays of memory cells each arranged as $2^M$ to the M power rows and 2 to the N columns;

said row decoding circuit being coupled to each of said X subarrays for selecting a predetermined one of said 2 to the M rows of memory cells;

a column decoding circuit for selecting one of said 2 to the N columns in each of said X subarrays, coupled, respectively, to each of said X subarrays;

said column decoding circuit including X subsections, each coupled to one of said X subarrays for independently selecting one of said 2 to the N columns of said subarray independently of said remaining subarrays;

a subarray selection circuit for selecting one of said X subarays;

each of said subarrays being coupled to said data input circuit and said data output circuit.

2. The semiconductor chip as recited in claim 1 wherein M equals 32, N equals 64, and X equals 2.

3. The semiconductor chip as recited in claim 2 wherein said first and second subarrays are separated by said row decoding circuit, said row decoding circuit providing substantially equivalent signals to each of said first and second subarrays.

4. The semiconductor memory chip as recited in claim 3 wherein said column decode circuit is physically separated into first and second substantially similar subsections for substantially simultaneously selecting, respectively, one of said 2 to the N columns of both said first subarray and said second subarray.

5. The semiconductor memory chip as recited in claim 1 further including a timing control register of 2 to the N bits coupled to one of said X subarrays for controlling timing signal circuitry on said semiconductor chip.

6. The semiconductor memory chip as recited in claim 1 further including a data control register of 2 to the N bits coupled to one of said X subarrays and to said data input circuit and said data output circuit.

7. The semiconductor memory chip as recited in claim 6 further including a data control register including 2 to the N bits coupled to one of said X subarrays and to said data circuit and to said data output circuit.

8. The semiconductor memory chip as recited in claim 7 wherein said memory cells are comprised of three transistors and said timing control register includes memory cells substantially similar to said three transistor memory cells and said timing control register includes memory cells substantially similar to said three transistor memory cells.

9. The semiconductor memory chip as recited in claim 8 wherein said other subarrays are not coupled to any data control registers.

10. The semiconductor memory chip as recited in claim 8 wherein said other subarrays are not coupled to any timing control registers.

11. An MOS memory array including at least two subarrays of inverting MOS storage cells comprising data control register circuit means coupled to only one of said subarrays of inverting MOS storage cells for storing information indicative of whether data in said subarrays is in an inverted condition, each of said subarrays of inverting MOS storage cells being coupled to common selection circuitry in said MOS memory array.

* * * * *

UNITED STATES PATENT AND TRADEMARK OFFICE
CERTIFICATE OF CORRECTION

PATENT NO. : 3,906,463

DATED : September 16, 1975

INVENTOR(S) : Robert Tapei Yu

It is certified that error appears in the above-identified patent and that said Letters Patent are hereby corrected as shown below:

In claim 1, line 6, change "$2^M$" to --2--.

Signed and Sealed this

*Twenty-ninth* Day of *November 1983*

[SEAL]

*Attest:*

GERALD J. MOSSINGHOFF

*Attesting Officer* *Commissioner of Patents and Trademarks*